US012752553B2

(12) United States Patent
Sato

(10) Patent No.: US 12,752,553 B2
(45) Date of Patent: Oct. 6, 2026

(54) SHEET CONVEYANCE APPARATUS AND IMAGE FORMING APPARATUS

(71) Applicant: CANON KABUSHIKI KAISHA, Tokyo (JP)

(72) Inventor: Koki Sato, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 19/221,981

(22) Filed: May 29, 2025

(65) Prior Publication Data

US 2025/0381786 A1 Dec. 18, 2025

(30) Foreign Application Priority Data

Jun. 12, 2024 (JP) ................................ 2024-095218

(51) Int. Cl.
*B41J 13/00* (2006.01)
*B41J 13/32* (2006.01)

(52) U.S. Cl.
CPC ........... *B41J 13/32* (2013.01); *B41J 13/0018* (2013.01)

(58) Field of Classification Search
CPC .............. B65H 9/002; B65H 2301/331; B65H 2404/14212; B65H 2404/143; B65H 2404/1441; B65H 2301/3251
See application file for complete search history.

(56) References Cited

U.S. PATENT DOCUMENTS

| | | | | | |
|---|---|---|---|---|---|
| 5,078,384 | A * | 1/1992 | Moore | B65H 7/08 | 271/228 |
| 6,053,494 | A * | 4/2000 | Baskette | B65H 29/60 | 271/274 |
| 6,779,791 | B2 * | 8/2004 | Kawamura | B65H 9/002 | 271/228 |
| 8,348,267 | B2 * | 1/2013 | Storey | B65H 9/166 | 271/228 |
| 8,424,873 | B2 * | 4/2013 | Storey | B65H 5/062 | 271/272 |
| 10,160,238 | B2 * | 12/2018 | Matsunaga | B41J 15/16 | |
| 2025/0051119 | A1 * | 2/2025 | Kawasumi | B65H 7/08 | |
| 2025/0296795 | A1 * | 9/2025 | Inoue | B41J 11/42 | |

FOREIGN PATENT DOCUMENTS

| | | | | |
|---|---|---|---|---|
| JP | 3727411 B2 * | 12/2005 | | B65H 29/40 |
| JP | 2013252918 A | 12/2013 | | |
| JP | 2018199572 A | 12/2018 | | |

* cited by examiner

*Primary Examiner* — Howard J Sanders
(74) *Attorney, Agent, or Firm* — ROSSI, KIMMS & McDOWELL LLP

(57) ABSTRACT

A sheet conveyance apparatus includes a first driving roller and a second driving roller, a first steering portion, a second steering portion, a first driven roller, a second driven roller, and a separation mechanism configured to switch a state of the first driven roller and the second driven roller between an abutment state and a separation state. The separation mechanism includes a swing member configured to support the first driven roller and the second driven roller and swing around a first swing axis extending along the sheet conveyance direction. The first swing axis is positioned between the first driven roller and the second driven roller in the sheet width direction.

16 Claims, 13 Drawing Sheets

SHEET CONVEYANCE APPARATUS AND IMAGE FORMING APPARATUS

BACKGROUND

Field of the Technology

The present disclosure relates to a sheet conveyance apparatus that conveys sheets, and an image forming apparatus that forms images on sheets.

Description of the Related Art

Japanese Patent Application Publication Nos. 2013-252918 and 2018-199572 disclose an image forming apparatus that includes a skew correction apparatus and a separation mechanism. The skew correction apparatus includes a pre-registration roller pair and a registration roller pair, and corrects the skew of sheets. The separation mechanism switches the state of the pre-registration roller pair between an abutment state and a separation state.

In Japanese Patent Application Publication No. 2013-252918, a pre-registration driven roller of the pre-registration roller pair is moved relative to a pre-registration driving roller, so that the state of the pre-registration roller pair is switched between the abutment state and the separation state. In a case where a plurality of nip portions of registration roller pairs is disposed in a sheet width direction, it is desired to achieve a sheet conveyance apparatus that reduces the failure in conveyance of sheets by reducing the difference in nip pressure of the plurality of nip portions.

SUMMARY

According to one aspect of the present disclosure, a sheet conveyance apparatus includes a first driving roller and a second driving roller disposed adjacent to each other in a sheet width direction orthogonal to a sheet conveyance direction, each of the first driving roller and the second driving roller being configured to rotate when receiving a driving force, a first steering portion configured to change a tilt angle of a rotation axis of the first driving roller with respect to the sheet width direction, a second steering portion configured to change a tilt angle of a rotation axis of the second driving roller with respect to the sheet width direction, a first driven roller configured to convey a sheet together with the first driving roller while nipping the sheet, the first driven roller being configured to pivot, in accordance with a change in the tilt angle of the rotation axis of the first driving roller, around a first pivot axis that intersects both of the sheet conveyance direction and the sheet width direction, a second driven roller configured to convey the sheet together with the second driving roller while nipping the sheet, the second driven roller being configured to pivot, in accordance with a change in the tilt angle of the rotation axis of the second driving roller, around a second pivot axis that intersects both of the sheet conveyance direction and the sheet width direction, and a separation mechanism configured to switch a state of the first driven roller and the second driven roller between an abutment state and a separation state, the abutment state being a state where the first driven roller and the second driven roller are respectively in contact with the first driving roller and the second driving roller, the separation state being a state where the first driven roller and the second driven roller are respectively separated from the first driving roller and the second driving roller. The separation mechanism includes a swing member configured to support the first driven roller and the second driven roller and swing around a first swing axis extending along the sheet conveyance direction. The first swing axis is positioned between the first driven roller and the second driven roller in the sheet width direction.

Features of the present disclosure will become apparent from the following description of embodiments with reference to the attached drawings. The following description of embodiments are described by way of example.

DESCRIPTION OF THE EMBODIMENTS

Hereinafter, an embodiment of the present disclosure will be described with reference to the accompanying drawings.

In the present disclosure, the image forming apparatus generally means an apparatus that forms an image on a sheet that is a recording material (recording medium), and examples of the image forming apparatus include at least a single-function printer, a copying machine, a multi-function printer, and a large-sized commercial printer. In addition, the image forming apparatus is not limited to an ink-jet recording apparatus described in the following embodiment. For example, the image forming apparatus may be an electrophotographic image forming apparatus that includes an electrophotographic image forming engine that serves as an image forming portion.

Schematic Configuration of Ink-Jet Recording Apparatus

Figure 1:
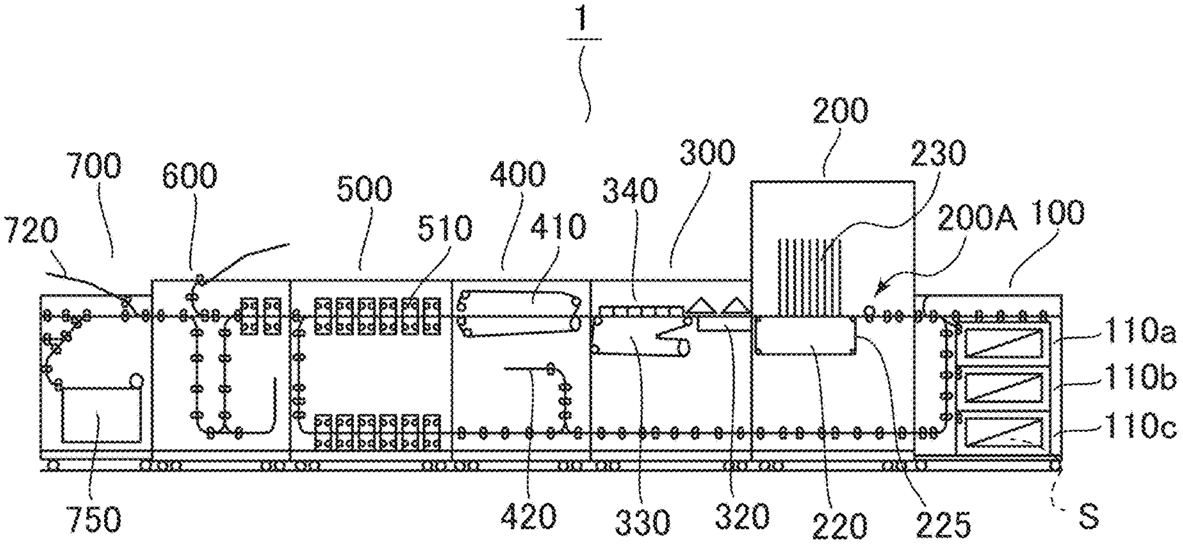
FIG. 1 is a schematic diagram of an ink-jet recording apparatus of the present embodiment.

FIG. 1 is a schematic diagram illustrating one example of a schematic configuration of an ink-jet recording apparatus 1 that serves as an image forming apparatus of the present embodiment. The ink-jet recording apparatus 1 is a sheet-fed ink-jet recording apparatus that produces a recorded product in which an ink image is formed on a sheet S, by using two liquids: reaction liquid and ink. The sheet S that serves as a recording material (recording medium) may be any one of a variety of sheets with different sizes and materials. For example, the sheet S may be a paper sheet, such as a regular paper sheet or a thick paper sheet, a sheet material, such as a coated paper sheet, on which certain surface treatment has been performed, a specially-shaped sheet material, such as an envelope or an index paper sheet, a plastic film, or a cloth sheet.

As illustrated in FIG. 1, the ink-jet recording apparatus 1 of the present embodiment includes a feeding module 100, a print module 200, a drying module 300, a fixing module 400, and a cooling module 500. In addition, the ink-jet recording apparatus 1 of the present embodiment includes a reversing module 600, and a stacking module 700. The sheet S, which is a cut sheet or the like, fed from the feeding module 100 is conveyed along a conveyance path, processed in each module, and stacked in the stacking module 700.

The feeding module 100 includes three cassettes 110*a*, 110*b*, and 110*c*, each of which stores the sheet S. Each of the cassettes 110*a*, 110*b*, and 110*c* can be drawn from the casing of the feeding module 100 toward a front side of the apparatus. The feeding module 100 causes a separation belt and a conveyance roller to feed the sheet S, stored in each of the cassettes 110*a* to 110*c*, one by one to the print module 200. Note that the number of the cassettes 110*a* to 110*c* is not limited to three. For example, the feeding module 100 may include one, two, or four or more cassettes.

Figure 2:
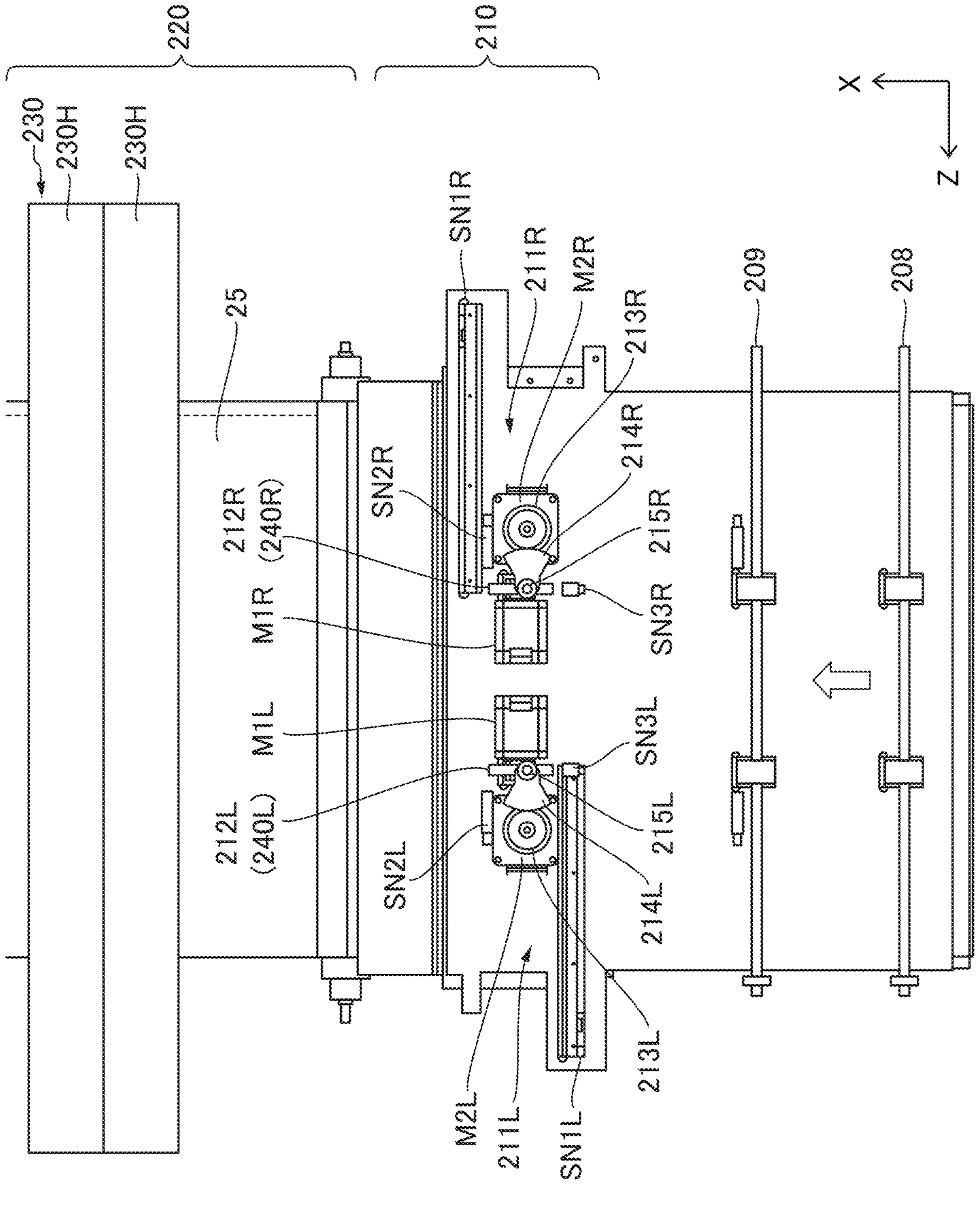
FIG. 2 is a plan view illustrating a sheet conveyance portion of a print module.

FIG. 2 is a plan view illustrating a sheet conveyance portion 200A of the print module 200. As illustrated in FIG. 2, the print module 200 includes a plurality of conveyance roller pairs 208 and 209, a registration unit (hereinafter referred to as a registration unit 210), a print belt unit 220, and a recording portion 230. The sheet S is conveyed from the feeding module 100 to the registration unit 210. The positional deviation of the sheet S is corrected by the registration unit 210, and the sheet S is then conveyed to the print belt unit 220. The recording portion 230 is disposed in a position that faces the print belt unit 220 via a conveyance path. The plurality of conveyance roller pairs 208 and 209 and the registration unit 210 constitute the sheet conveyance portion 200A that conveys the sheet S to the recording portion 230.

The registration unit 210 is an example of a sheet conveyance apparatus that conveys the sheet S. The print module 200 or the ink-jet recording apparatus 1 is an example of an image forming apparatus (image forming system) that includes the registration unit (sheet conveyance apparatus) 210, and the recording portion 230 that serves as an image forming portion.

In the present embodiment, the positional deviation of the sheet S includes both of positional deviation (hereinafter referred to as lateral deviation) of the sheet S in a sheet width direction, and positional deviation (hereinafter referred to as skew) of the sheet S in a rotational direction, viewed from a thickness direction of the sheet S. Correcting the skew of the sheet S is referred to as skew correction. Positioning the sheet S in a desired position in the sheet width direction by correcting the lateral deviation of the sheet S is referred to as lateral registration. As described below, the registration unit 210 of the present embodiment performs the correcting operation that simultaneously corrects both of the skew and the lateral deviation of the sheet S. The correcting operation may be performed on a single sheet S in multiple stages. Note that the registration unit 210 may correct only one of the lateral deviation and the skew.

The print belt unit 220 includes a print belt 25 stretched by and wound around a plurality of rollers and having air permeability, and a pump unit that generates negative pressure in an inside space of the print belt 25. The recording portion 230 is a sheet processing portion (image forming portion) that forms an image by causing a recording head 230H to perform the recording process (printing or printing operation) on the sheet S. The recording head 230H performs the recording process from a position above the sheet S that is being conveyed. The clearance between the recording head 230H and the sheet S is ensured by the sheet S being conveyed, while attracted onto the print belt 25, by the print belt unit 220. In addition, the recording head 230H is constituted by a plurality of recording heads, and the recording heads are disposed along the conveyance direction. In the present embodiment, the recording portion 230 includes line-type recording heads whose number is five in total. The line-type recording heads correspond to a reaction liquid in addition to four colors of Y (yellow), M (magenta), C (cyan), and Bk (black).

Note that the number of colors and the number of the recording heads are not limited to five. The ink-jet system used may be a system that uses a heater element, a system that uses a piezoelectric element, a system that uses an electrostatic element, or a system that uses a micro-electro-mechanical systems (MEMS) element. The ink of each color is supplied to the recording head 230H from an ink tank, via an ink tube. The sheet S on which an image has been formed in the recording portion 230 is conveyed by the print belt unit 220. The deviation and color density of the image formed on the sheet S are detected by an inline scanner disposed downstream of the recording portion 230 in the conveyance direction, so that the print image can be corrected.

The drying module 300 includes a decoupling portion 320, a drying belt unit 330, and a warm-air blowing portion 340. The drying module 300 is a unit that increases the fixability between the sheet S and the ink by reducing the liquid component of the ink given to the sheet by the recording portion 230. The sheet S on which an image has been formed in the recording portion 230 of the print module 200 is conveyed to the decoupling portion 320 disposed in the drying module 300. In the decoupling portion 320, the sheet S is conveyed by the wind pressure applied from above and the friction of the belt. In addition, since the sheet S on the belt is conveyed while held not tightly, the sheet S can be prevented from deviating on the print belt unit 220 that forms an ink image. While attracted and conveyed in the drying belt unit 330, the sheet S conveyed from the decoupling portion 320 is given warm air from the warm-air blowing portion 340 disposed above the belt, so that the surface of the sheet S to which the ink has been given is dried. In the drying system, a system that emits electromagnetic wave (such as ultraviolet rays or infrared rays) to the surface of the sheet S, or a heat transfer system that causes a heating element to contact the sheet S may be used, and be combined with the system that gives the warm air to the sheet S.

The fixing module 400 includes a fixing-belt unit 410 that includes an upper belt unit and a lower belt unit. The fixing module 400 fixes the ink to the sheet S conveyed from the drying module 300, by causing the sheet S to pass through between the upper belt unit and the lower belt unit that are heated.

The cooling module 500 includes a plurality of cooling portions 510, and cools the high-temperature sheet S conveyed from the fixing module 400. Each of the cooling portions 510 cools the sheet S by increasing the pressure of a corresponding cooling box by taking the external air in the cooling box by using a fan, and by causing the pressure of the cooling box to blow the wind, ejected from a nozzle formed in a conveyance guide, on the sheet S. The cooling portions 510 are disposed on both sides of the conveyance path, and cool both sides of the sheet S. In addition, in the cooling module 500, a conveyance-path switch portion is disposed. The conveyance-path switch portion switches the conveyance path of the sheet S between a path for conveying the sheet S to the reversing module 600, and a duplex conveyance path used in the double-side printing. In the double-side printing, the sheet S on which first side an image has been formed is conveyed to a conveyance path disposed in a lower portion of the cooling module 500, and is conveyed through a duplex conveyance path of each of the fixing module 400, the drying module 300, the print module 200, and the feeding module 100. Then the sheet S is conveyed again to the registration unit 210, the print belt unit 220, and the recording portion 230 of the print module 200, so that an image is formed on a second side of the sheet S opposite to the first side.

In the duplex conveyance path of the fixing module 400, a first reversing portion 420 that reverses the front side and back side of the sheet S is disposed. The reversing module 600 includes a second reversing portion, and can reverse the front side and the back side of the sheet S conveyed. The reversing module 600 can freely change the front side, back side, and orientation of the sheet S to be discharged.

The stacking module 700 includes a top tray 720 and a stacking portion 750; and stacks the sheet S conveyed from the reversing module 600, while aligning the sheet S.

Registration Unit

Figure 3:
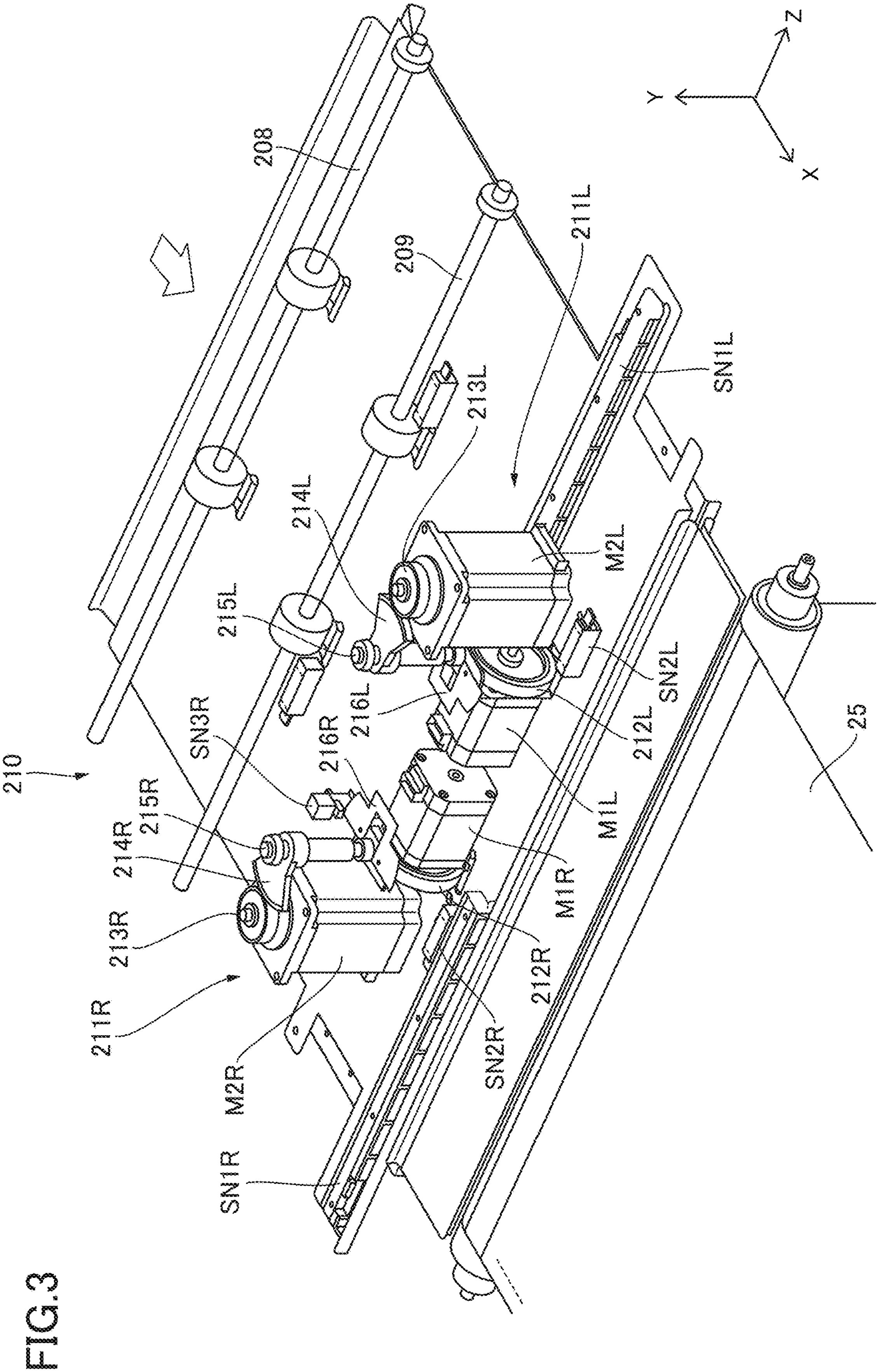
FIG. 3 is a perspective view illustrating a registration unit.
Figure 6:
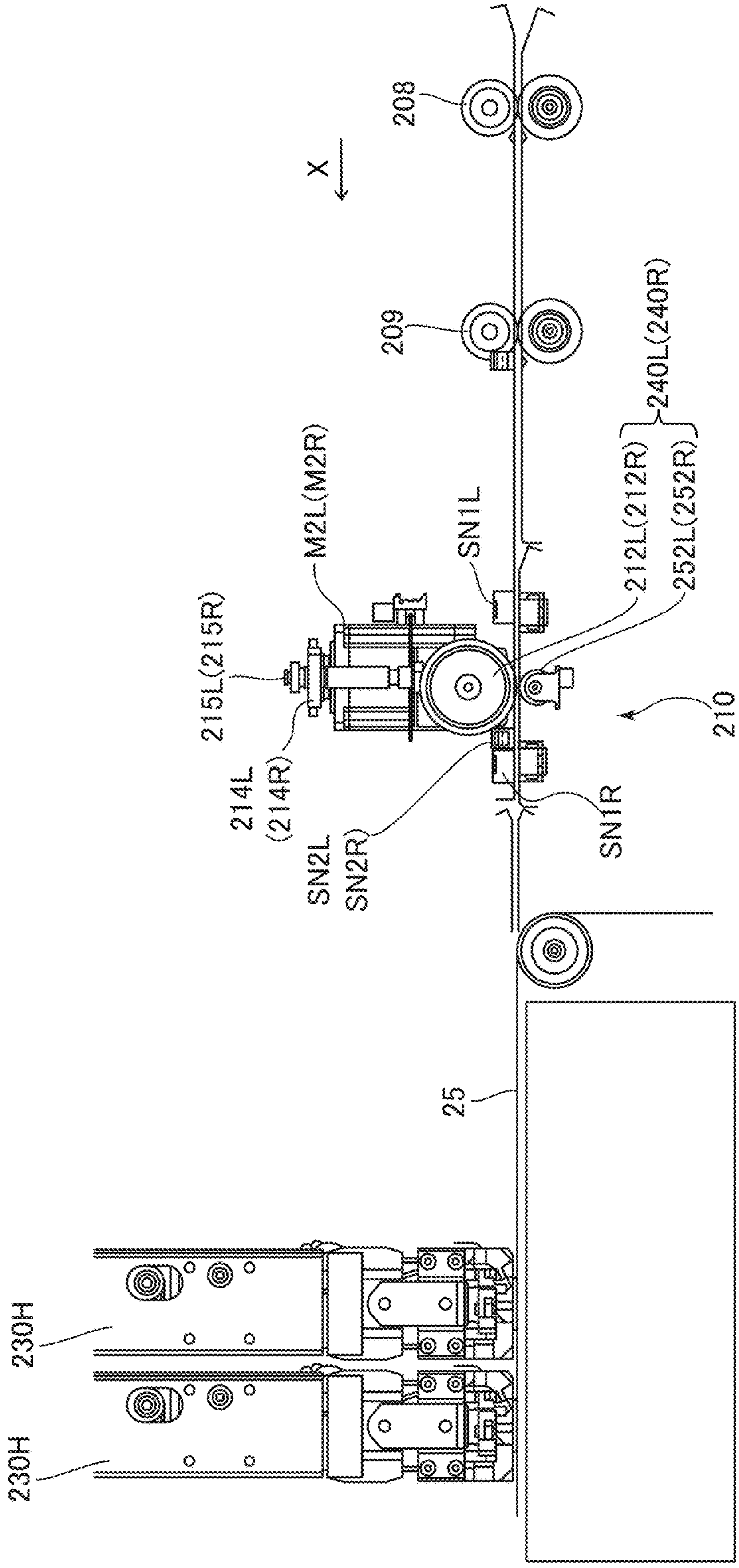
FIG. 6 is a cross-sectional view of the registration unit taken along a plane orthogonal to a sheet width direction.

Next, a schematic configuration of the registration unit 210 will be described with reference to FIGS. 2, 3, and 6. FIG. 3 is a perspective view illustrating the registration unit 210. FIG. 6 is a cross-sectional view of the registration unit 210 taken along a plane orthogonal to a sheet width direction.

In the following description and the figures, the conveyance direction of the sheet S in the registration unit 210 is referred to as a sheet conveyance direction, and indicated by an arrow (X) in the figures. A sheet width direction orthogonal to the sheet conveyance direction is indicated by an arrow (Z) in the figures. The left side (i.e., the leading end side of the arrow (Z), or +Z side) of the sheet width direction (Z) viewed in the sheet conveyance direction (X) is expressed as left, and the right side (i.e., the side opposite to the arrow (Z), or −Z side) of the sheet width direction (Z) viewed in the sheet conveyance direction (X) is expressed as right. In addition, a direction orthogonal to both of the sheet conveyance direction (X) and the sheet width direction (Z) is indicated by an arrow (Y) in the figures (see FIG. 3).

Note that for correcting the sheet position in the sheet width direction, there is a case where the registration unit 210 obliquely conveys the sheet S by using registration roller pairs (240L, 240R). The sheet conveyance direction (X) is a constant direction regardless of whether the sheet S is obliquely conveyed. Specifically, the sheet conveyance direction (X) of the present embodiment is parallel with a conveyance direction of the sheet S conveyed by conveyance members that convey the sheet S, without obliquely conveying the sheet S, on the upstream side and the downstream side of the registration roller pairs (240L, 240R). Examples of the conveyance members disposed upstream of the registration roller pairs (240L, 240R) are below-described conveyance roller pairs (208, 209), and an example of the conveyance members disposed downstream of the registration roller pairs (240L, 240R) is a below-described print belt 25.

As illustrated in FIGS. 2, 3, and 6, the registration unit 210 includes the conveyance roller pairs 208 and 209, registration rollers 212L and 212R, caster rollers 252L and 252R, conveyance driving motors M1L and M1R, and steering motors M2L and M2R. In addition, the registration unit 210 includes image sensors SN1L and SN1R, registration sensors SN2L and SN2R, and home-position sensors SN3L and SN3R.

Each of the registration rollers 212L and 212R is an example of a driving roller that receives driving force and rotates. Each of the caster rollers 252L and 252R is an example of a driven roller that, together with the driving roller, nips and conveys the sheet. In a case where the registration roller 212L and the caster roller 252L disposed on one side (first side) in the sheet width direction (Z) are respectively referred to as a first driving roller and a first driven roller, the registration roller 212R and the caster roller 252R disposed on the other side (second side) are respectively referred to as a second driving roller and a second driven roller.

One set of the registration roller 212L, the caster roller 252L, the conveyance driving motor M1L, and the steering motor M2L is disposed on the left side, and the other set of the registration roller 212R, the caster roller 252R, the conveyance driving motor M1R, and the steering motor M2R is disposed on the right side. Similarly, one set of the image sensor SN1L, the registration sensor SN2L, and the home-position sensor SN3L is disposed on the left side, and the other set of the image sensor SN1R, the registration sensor SN2R, and the home-position sensor SN3R is disposed on the right side.

In the sheet conveyance direction (X), the conveyance roller pair 209 is disposed downstream of the conveyance roller pair 208, the registration roller pairs 240L and 240R are disposed downstream of the conveyance roller pair 209, and the print belt unit 220 is disposed downstream of the registration roller pairs. Each of the conveyance roller pairs 208 and 209 is constituted by an upper roller and a lower roller. The upper roller is a rubber roller made of EPDM (ethylene-propylene-diene rubber) or the like. The lower roller is in contact with the upper roller, and is made of urethane or the like. The upper roller is driven and rotated by a motor. More specifically, the left registration roller 212L is driven and rotated by the left conveyance driving motor M1L, and the right registration roller 212R is driven and rotated by the right conveyance driving motor M1R. The lower rollers (the caster rollers 252L and 252R) are urged toward the upper rollers by springs, and are rotated in accordance with the rotation of the upper rollers.

The registration rollers 212L and 212R, and the caster rollers 252L and 252R constitute the registration roller pairs 240L and 240R that nip and convey the sheet S. In the present embodiment, the left registration roller 212L and the left caster roller 252L constitute the left registration roller pair 240L, and the right registration roller 212R and the right caster roller 252R constitute the right registration roller pair 240R.

In addition, the left steering motor M2L changes the steering angle of the left registration roller 212L. The right steering motor M2R changes the steering angle of the right registration roller 212R. Since the steering angle of the registration rollers 212L and 212R is changed, the conveyance force given to the sheet S by the registration rollers 212L and 212R has a component in the sheet width direction (Z). As a result, the sheet S can be conveyed obliquely with respect to the sheet conveyance direction (X).

The steering angle of each of the registration rollers 212L and 212R is a tilt angle of the rotation axis of the roller with respect to the sheet width direction (Z), viewed in the Y direction orthogonal to both of the sheet conveyance direction (X) and the sheet width direction (Z). In other words, the steering angle is an angle formed by the moving direction of a roller surface of a contact portion that contacts the sheet S, with respect to the sheet conveyance direction (X), or a tilt angle formed by the vector of the force (conveyance force) given to the sheet S by each of the registration rollers 212L and 212R, with respect to the sheet conveyance direction (X). In the following description, the pivot of a roller means a motion in which the steering angle of the roller is changed by the rotation axis of the roller rotating around the axis that intersects both of the sheet width direction (Z) and the sheet conveyance direction (X). For example, the above-described axis that intersects both of the sheet width direction (Z) and the sheet conveyance direction (X) is an axis parallel with the Y direction. However, the above-described axis may not necessarily be an axis parallel with the Y direction.

The left caster roller 252L is a driven roller that rotates in accordance with the rotation of the left registration roller 212L. The right caster roller 252R is a driven roller that rotates in accordance with the rotation of the right registration roller 212R. The caster roller 252L can pivot in accordance with the pivot of the registration roller 212L. The caster roller 252R can pivot in accordance with the pivot of the registration roller 212R. That is, each of the caster rollers 252L and 252R (i.e., driven tollers) pivots around a pivot axis that intersects both of the sheet conveyance direction and the sheet width direction, in accordance with the change in the tilt angle of a corresponding one of the registration rollers 212L and 212R (i.e., driving rollers). The pivot axis in the present embodiment is parallel with the Y direction.

The home-position sensors SN3L and SN3R are respectively disposed in the vicinity of the registration rollers 212L and 212R. The home positions of the registration rollers 212L and 212R are respectively detected by the home-position sensors SN3L and SN3R. Note that the home position of each of the registration rollers 212L and 212R is a position at which the rotation axis of the registration roller is parallel with the sheet width direction (Z), that is, a position at which the steering angle of the registration roller is 0 degrees. Since the home positions of the registration rollers 212L and 212R are detected by the home-position sensors SN3L and SN3R, the registration rollers 212L and 212R can be returned to their home positions.

Driving and Pivoting Mechanism

Next, with reference to FIGS. 2 and 3, driving-and-pivoting mechanisms 211L and 211R disposed in the registration unit 210 will be described. The driving-and-pivoting mechanisms 211L and 211R rotate and pivot the registration rollers 212L and 212R, respectively. As illustrated in FIGS. 2 and 3, the driving-and-pivoting mechanism 211L includes the conveyance driving motor M1L, the steering motor M2L, a motor gear 213L, a driving-force input gear 214L, a steering shaft 215L, and a frame 216L. Similarly, the driving-and-pivoting mechanism 211R includes the conveyance driving motor M1R, the steering motor M2R, a motor gear 213R, a driving-force input gear 214R, a steering shaft 215R, and a frame 216R.

The left frame 216L is fixed to the steering shaft 215L, and supports the registration roller 212L and the conveyance driving motor M1L. Similarly, the right frame 216R is fixed to the steering shaft 215R, and supports the registration roller 212R and the conveyance driving motor M1R. The fan-shaped driving-force input gears 214L and 214R are respectively attached to the steering shafts 215L and 215R. The motor gears 213L and 213R of the steering motors M2L and M2R mesh with the driving-force input gears 214L and 214R, respectively.

Figure 4A:
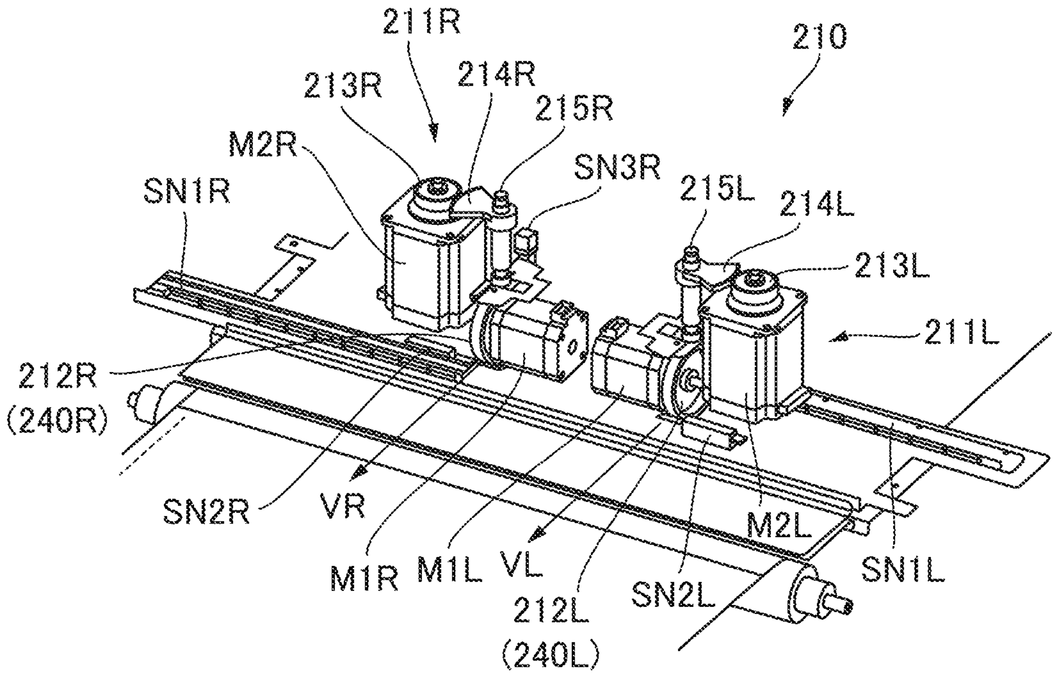
FIG. 4A is a diagram illustrating operations of registration rollers.
Figure 4B:
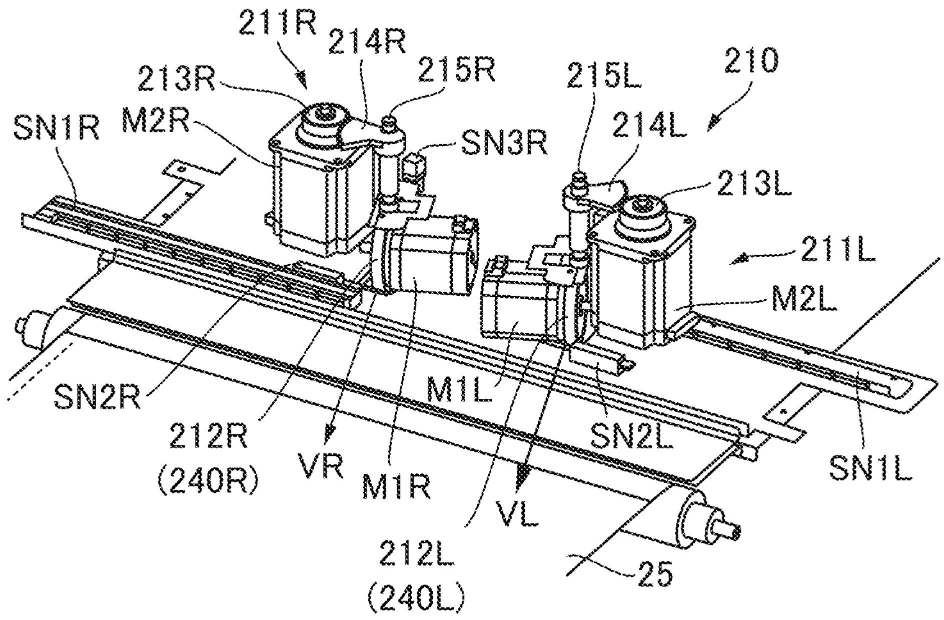
FIG. 4B is a diagram illustrating operations of the registration rollers.

Thus, the left registration roller 212L is pivoted together with the frame 216L by the rotation of the steering motor M2L, so that the steering angle of the registration roller 212L is changed (see FIGS. 4A and 4B). Similarly, the right registration roller 212R is pivoted together with the frame 216R by the rotation of the steering motor M2R, so that the steering angle of the registration roller 212R is changed. Note that since the conveyance driving motor M1L is supported by the frame 216L, the conveyance driving motor M1L also pivots around the steering shaft 215L, together with the corresponding registration roller 212L. Similarly, since the conveyance driving motor M1R is supported by the frame 216R, the conveyance driving motor M1R also pivots around the steering shaft 215R, together with the corresponding registration roller 212R.

Since the driving-and-pivoting mechanisms 211L and 211R are configured in this manner, the registration rollers 212L and 212R can change the conveyance speed of the sheet S independently. In addition, the registration rollers 212L and 212R can change the conveyance direction of the sheet S independently.

The steering motor M2L is an example of a steering portion (i.e., a first steering portion) that changes the inclination (i.e., a steering angle) of the rotation axis of the registration roller 212L with respect to the sheet width direction (Z). The steering motor M2R is an example of a steering portion (i.e., a second steering portion) that changes the inclination (i.e., a steering angle) of the rotation axis of the registration roller 212R with respect to the sheet width direction (Z).

Skew Correction Portion

A set of two or more sensors disposed in different positions in the sheet width direction (Z) can function as a skew correction portion that detects the amount of skew of the sheet S. The amount of skew corresponds to the tilt angle of the leading edge of the sheet S (i.e., the downstream edge of the sheet S in the sheet conveyance direction), with respect to the sheet width direction (Z).

The set of the left registration sensor SN2L and the right registration sensor SN2R is a skew correction portion that detects the skew of the sheet S that is a positional deviation of the sheet S in a rotational direction. In other words, the skew correction portion is a posture detection portion that detects the posture of the sheet S. The posture of the sheet S corresponds to the tilt angle of the leading edge of the sheet S with respect to the sheet width direction (Z).

A below-described controller 50 (see FIG. 7) calculates the amount of skew of the sheet S obtained in positions of the registration sensors SN2L and SN2R, based on the difference between the time at which the left registration sensor SN2L detects the leading edge of a sheet and the time at which the right registration sensor SN2R detects the leading edge of the sheet, and on the conveyance speed at which the sheet S is conveyed. Note that instead of the set of the two or more sensors, an image sensor that captures an image may be used. In this case, the skew of the sheet S may be detected by analyzing the image by using the image sensor.

Lateral-Deviation Detection Portion

A set of the image sensors SN1L and SN1R is an example of a detection portion that detects the positional deviation of the sheet S. In the present embodiment, the set of the image sensors SN1L and SN1R is a lateral-deviation detection portion that detects the lateral deviation of the sheet S that is a positional deviation in the sheet width direction (Z).

The image sensors SN1L and SN1R are respectively disposed in the vicinity of the registration roller pairs 240L and 240R. More specifically, in the sheet conveyance direction X, the image sensor SN1L is disposed upstream of the registration roller pair 240L, and the image sensor SN1R is disposed downstream of the registration roller pair 240R.

Each of the image sensors SN1L and SN1R is an optical sensor (line sensor), such as a CIS sensor, that has an image capture area that extends in the sheet width direction (Z). The left image sensor SN1L detects the position of the left side-edge of the sheet S, and the right image sensor SN1R detects the position of the right side-edge of the sheet S. Each of the image sensors SN1L and SN1R is disposed so as to be able to detect the side edge of the maximum-size sheet and the minimum-size sheet of sheets on which the ink-jet recording apparatus 1 can form images. The controller 50 can calculate the amount of lateral deviation, based on the side-edge position of the sheet S detected by the right and left image sensors SN1R and SN1L.

Note that instead of the two image sensors SN1L and SN1R, a single image sensor that covers an area (i.e., a maximum sheet-passing area) that a sheet S having the maximum size in the sheet width direction (Z) passes may be used. In another case, the detection of the amount of lateral deviation and the lateral-deviation correction may be performed by using only one of the right and left image sensors SN1R and SN1L.

Controller

Figure 7:
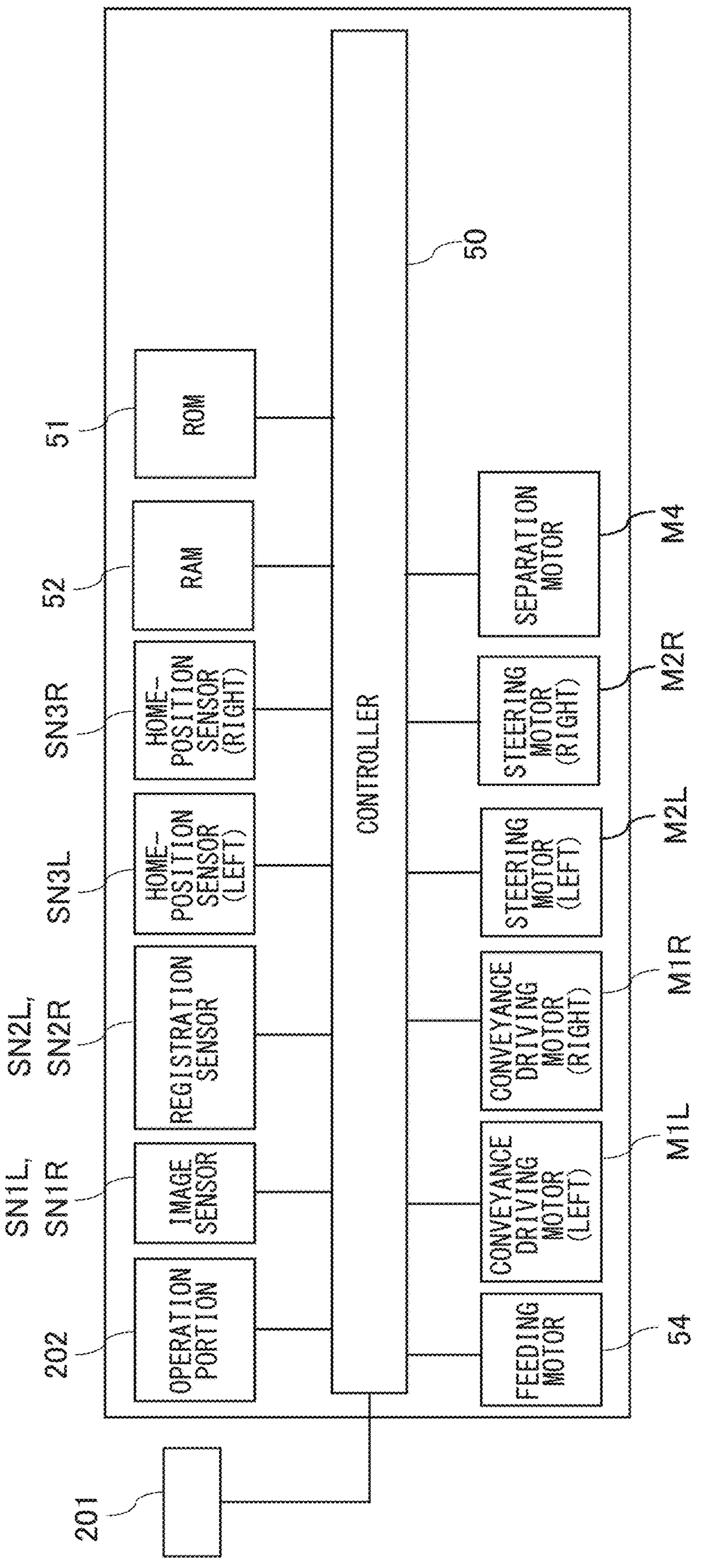
FIG. 7 is a block diagram illustrating a control system of the present embodiment.

FIG. 7 is a block diagram illustrating a configuration of control of the registration unit 210. The operation of the registration unit 210 is controlled by the controller 50 that serves as a control portion. The controller 50 is connected with a ROM 51 and a RAM 52 that serve as a memory portion. For example, the controller 50 controls the operation of the registration unit 210 by reading a program stored in the ROM 51, depending on an instruction from an external computer 201, and by executing the program while using the RAM 52 as a work memory. The controller 50 may be a control portion that collectively controls the operation of the whole of the print module 200. Note that part or all of the below-described functions of the controller 50 may be executed by another control portion included in the ink-jet recording apparatus 1.

The controller 50 receives detection signals from the image sensors SN1L and SN1R, the registration sensors SN2L and SN2R, and the home-position sensors SN3L and SN3R. In addition, the controller 50 sends instructions to a feeding motor 54, the steering motors M2L and M2R, the conveyance driving motors M1L and M1R, and a below-described separation motor M4, and thereby starts and stops each motor, and controls the amount of rotation, the angular velocity, and the like. The feeding motor 54 is a driving source for a separation belt and the like of the feeding module 100.

In addition, the controller 50 is communicatively connected with an operation portion 202 that is a user interface of the ink-jet recording apparatus 1. The operation portion 202 includes a display portion, such as a liquid crystal panel, that displays an image, as information, for a user; an input portion, such as buttons and touch-panel functions of the liquid crystal panel, that accepts input from a user.

As described below, the controller 50 executes a correcting operation that corrects the positional deviation of the sheet S, based on detection results from the skew correction portion and the lateral-deviation detection portion. The controller 50 performs the lateral-deviation correction on the sheet S by controlling the amount of rotation of the steering motors M2L and M2R, mainly based on detection results from the image sensors SN1L and SN1R. In addition, the controller 50 performs the skew correction on the sheet S by controlling the angular velocity of the right and left conveyance driving motors M1R and M1L, mainly based on detection results from the registration sensors SN2L and SN2R.

In addition, the controller 50 causes the right and left caster rollers 252R and 252L to abut against and separate from the registration rollers 212L and 212R, by using the separation motor M4 that serves as a driving source. In addition, the controller 50 detects the home positions of the right and left registration rollers 212R and 212L, based on detection results from the right and left home-position sensors SN3R and SN3L.

Operation of Print Module

Figure 8:
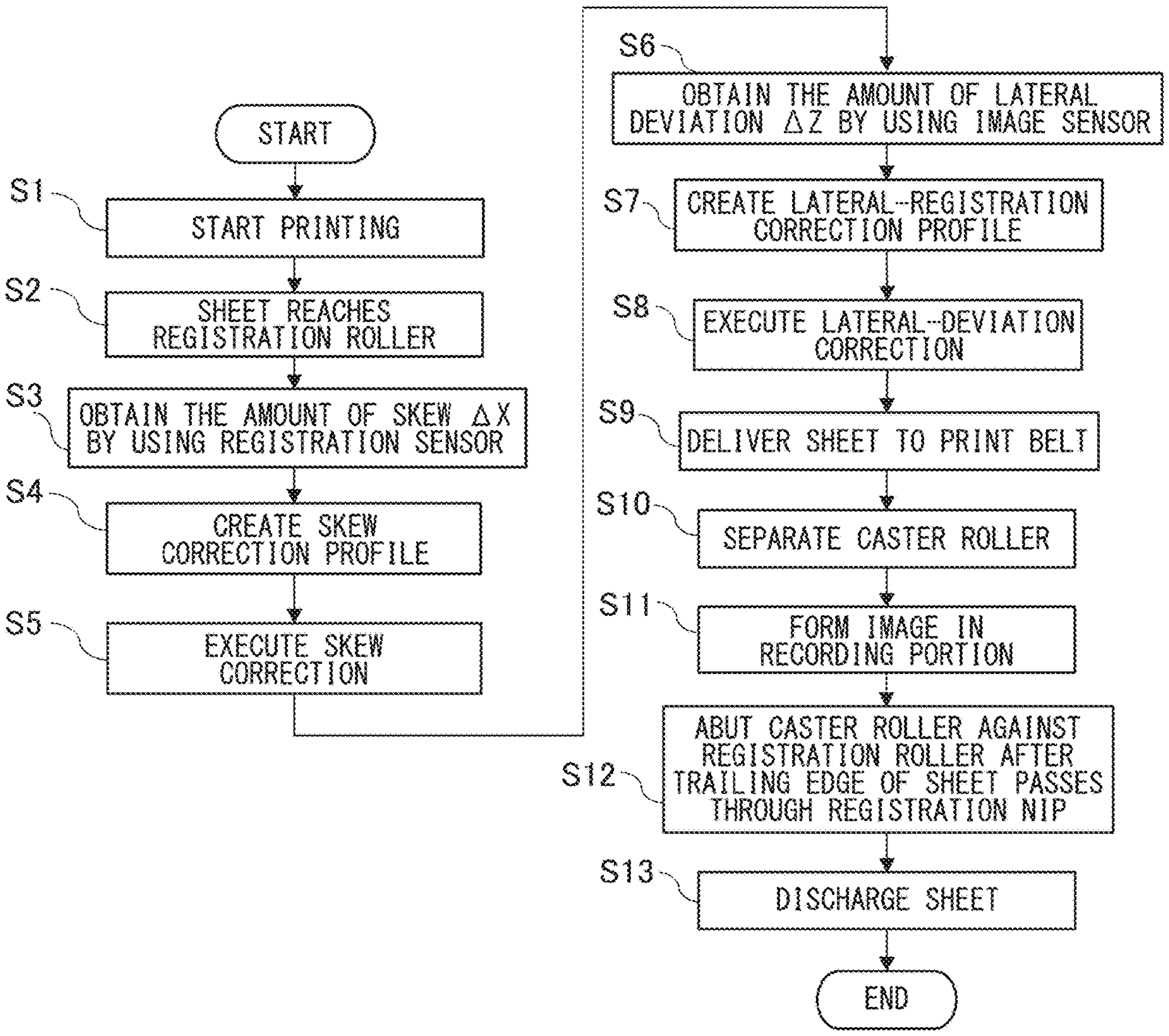
FIG. 8 is a flowchart illustrating control of the print module.

Next, an operation of the print module 200 that includes the skew correction and the lateral-deviation correction performed by the registration unit 210 will be described with reference to FIGS. 4A to 5C and FIG. 8. FIGS. 4A to 5C are diagrams illustrating an operation of the registration rollers 212L and 212R. FIG. 8 is a flowchart illustrating the control of the print module 200. In particular, FIG. 8 illustrates an operation of the registration unit 210.

In the flowchart illustrated in FIG. 8, the description will be made, as an example, for a procedure of a printing job (single-side printing job) that forms an image on only one side (i.e., a first side) of the sheet S. The image forming operation is a series of operations in which the ink-jet recording apparatus 1 that serves as an image forming apparatus forms an image on a sheet S while conveying the sheet S. The printing job is a series of tasks that includes the image forming operation performed on at least one sheet S. Each step of the flowchart is executed by the controller 50. Note that in a printing job (i.e., a double-side printing job) that forms images on both sides (i.e., a first side and a second side) of the sheet S, the control illustrated in FIG. 8 is performed twice.

As illustrated in FIG. 8, in Step S1, if the controller 50 receives an instruction (printing job) for executing an image forming operation, then the controller 50 starts a single-side printing job. The controller 50 receives the printing job from the operation portion 202 operated by a user (e.g., by a user pressing a printing-execution button), or from the external computer 201 connected to the controller 50 directly or via a network. The printing job received by the controller 50 includes the number of sheets to be printed, specified by a user, and setting information (i.e., job information), such as the size of the sheet S used for the printing job. The controller 50 analyzes the printing job received, and executes the image forming operation in accordance with the job information.

Note that in a case where a printing job is performed for successively forming images on a plurality of sheets S, the following steps S2 to S13 for one sheet S are performed in parallel with the steps S2 to S13 for another sheet S, with a time difference being set between the steps S2 to S13 for the one sheet S and the steps S2 to S13 for the other sheet S. The following description will be made for a case where a series of processes (S2 to S13) is performed on a single sheet (i.e., a current sheet) in a printing job. A sheet S fed after the current sheet in the printing job is referred to as a following sheet. In particular, a sheet S fed next to the current sheet in a printing job is referred to as a next sheet.

The controller 50 selects the sheet S that has a size specified in the printing job, from among the cassettes 110*a*, 110*b*, and 110*c*, for example. Then the controller 50 feeds the sheet S, which has the size specified in the job information, from the feeding module 100 by rotating the feeding motor 54. Then the controller 50 causes the conveyance roller pairs 208 and 209 (see FIG. 2) to convey the sheet S toward the registration unit 210, and causes the sheet S to reach the registration roller pairs 240L and 240R, by driving the driving motors and the like (S2). For example, the controller 50 can detect that the sheet S has reached the registration rollers 212L and 212R, depending on the detection of the leading edge of the sheet performed by the registration sensors SN2L and SN2R.

In Step S3, the controller 50 obtains the amount of skew ΔX, depending on detection results from the registration sensors SN2L and SN2R. Specifically, the controller 50 calculates the amount of skew ΔX of the sheet S, based on the difference between the time at which the left registration sensor SN2L detects the leading edge of the sheet S and the time at which the right registration sensor SN2R detects the leading edge of the sheet S, and on the sheet conveyance speed produced by the conveyance roller pairs 208 and 209.

In Step S4, the controller 50 creates a skew correction profile of the conveyance driving motors M1L and M1R and the steering motors M2L and M2R, based on the amount of skew ΔX obtained in Step S3. In Step S5, the controller 50 executes the skew correction by controlling the operation of the conveyance driving motors M1L and M1R and the steering motors M2L and M2R in accordance with the skew correction profile created in Step S4. The series of operations of the steps S3 to S5 may be referred to as an active operation.

Specifically, the conveyance driving motors M1L and M1R are driven, depending on an instruction from the controller 50, in accordance with the skew correction profile, so that the rotation speeds of the registration roller pairs 240L and 240R are driven and controlled independently. For example, in a state illustrated in FIGS. 4A and 5A, the conveyance driving motors M1L and M1R are controlled so that the sheet conveyance speeds of the registration roller pairs 240L and 240R are respectively equal to conveyance speeds VL and VR. In a case illustrated in FIG. 5B, the tilt angle (the amount of skew ΔX) of the sheet S conveyed obliquely is detected, the skew correction profile is created, and the conveyance driving motors M1L and M1R are driven and controlled independently in accordance with the skew correction profile. Specifically, the controller 50 performs the control so that the conveyance speed VR of the registration roller pair 240R is made higher than the conveyance speed VL of the registration roller pair 240L. As a result, the sheet S is pivoted as indicated by an arrow ω in FIG. 5B, so that the skew of the sheet S is corrected as indicated by a broken line in FIG. 5B. In other words, the controller 50 corrects the skew of the sheet S by controlling the difference in conveyance speed between the registration rollers 212L and 212R.

In Step S6, the controller 50 obtains the amount of lateral deviation ΔZ of the sheet S, depending on detection results from the image sensors SN1L and SN1R. The controller 50 detects a portion of the image sensors SN1L and SN1R that the sheet S covers, and thereby detects the positions of both edges of the sheet S in the sheet width direction Z; and calculates the amount of lateral deviation ΔZ, based on the positions of both edges of the sheet S. In Step S7, the controller 50 creates a lateral-registration correction profile of the conveyance driving motors M1L and M1R and the steering motors M2L and M2R, based on the amount of lateral deviation ΔZ obtained in Step S6. In Step S8, the controller 50 executes the lateral registration correction by controlling the operation of the conveyance driving motors M1L and M1R and the steering motors M2L and M2R in accordance with the lateral-registration correction profile created in Step S7. The series of operations of the steps S6 to S8 may be referred to as an active registration.

Specifically, the steering motors M2L and M2R are driven, depending on an instruction from the controller 50, in accordance with the lateral-registration correction profile, so that the pivot angles of the registration roller pairs 240L and 240R are controlled independently. For example, in a state illustrated in FIGS. 4A and 5A, the steering angles of the registration rollers 212L and 212R are controlled by the steering motors M2L and M2R so that the registration rollers 212L and 212R are positioned in the positions in which the home positions of the registration roller 212L and 212R are detected by the above-described home-position sensors SN3L and SN3R. Thus, the registration roller pairs 240L and 240R are positioned so as to face directly to the sheet conveyance direction X.

Figure 5A:
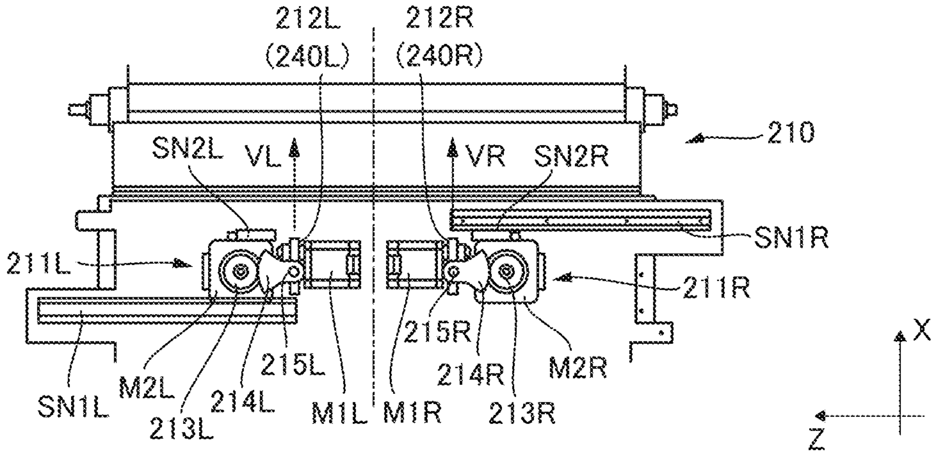
FIG. 5A is a plan view illustrating sheet conveyance speeds of registration roller pairs.
Figure 5B:
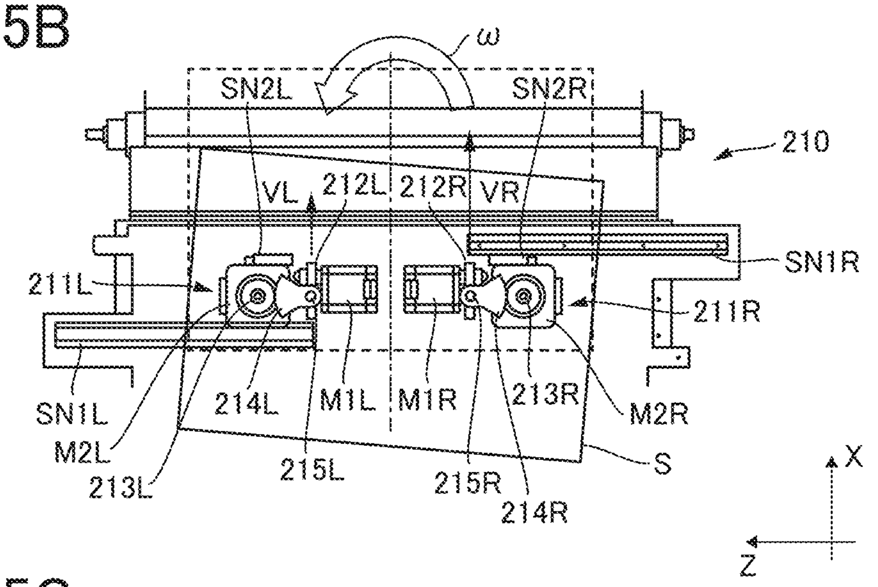
FIG. 5B is a plan view illustrating a state where a sheet has been conveyed while skewed.
Figure 5C:
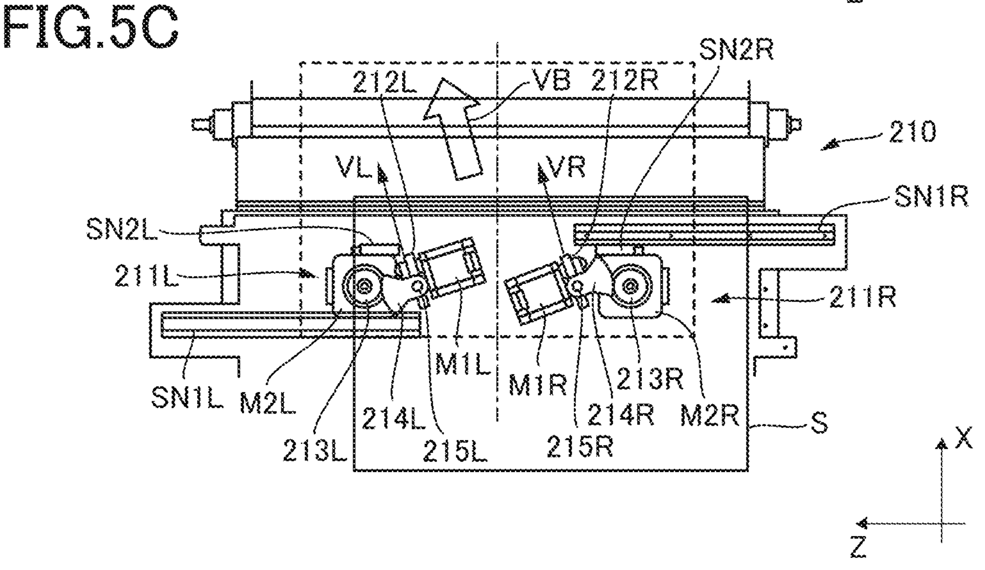
FIG. 5C is a plan view illustrating a state where lateral registration correction is performed on a sheet.

In a case illustrated in FIG. 5C, the lateral-deviation position of the sheet S conveyed while deviated laterally is detected, the lateral-registration correction profile is created, and the steering motors M2L and M2R are driven and controlled independently in accordance with the lateral-registration correction profile. Specifically, the registration roller pairs 240L and 240R are pivoted and controlled so that the registration roller pair 240L conveys the sheet S at the conveyance speed VL in a direction to which the registration roller pair 240L has been pivoted, and that the registration roller pair 240R conveys the sheet S at the conveyance speed VR in a direction to which the registration roller pair 240R has been pivoted. With this operation, the sheet S is conveyed while moved in the sheet width direction W, as indicated by an arrow VB in FIG. 5C, so that the lateral registration position of the sheet S is corrected, as indicated by a broken line in FIG. 5C, so that the lateral registration position is equal to a reference position (which is equal to the center of conveyance). Note that in a normal case in which the skew correction is not performed in the lateral registration correction, the control is performed so that the conveyance speeds VL and VR of the registration roller pairs 240L and 240R are equal to each other, and that the pivot angles of the registration roller pairs 240L and 240R are equal to each other.

In Step S9, the sheet S is delivered from the registration rollers 212L and 212R to the print belt 25. In Step S10, the controller 50 causes a separation mechanism 270, which will be described in detail below, to separate the caster rollers 252L and 252R from the registration rollers 212L and 212R. That is, after the leading edge of the sheet S reaches the print belt 25 that is a conveyance member disposed downstream of the registration roller pairs 240L and 240R, the controller 50 changes the state of the registration roller pairs 240L and 240R from an abutment state to a separation state. In the present embodiment, the controller 50 changes the state of the registration roller pairs 240L and 240R from the abutment state to the separation state before the trailing edge of the sheet S passes through the registration roller pairs 240L and 240R.

In Step S11, the controller 50 causes the recording portion 230 to start the recording process. Note that the separation (S10) of the caster rollers 252L and 252R may be performed after the start (S11) of the recording process. In Step S12, after the trailing edge of the sheet S passes through a nip (registration nip) of the registration roller pairs 240L and 240R, the controller 50 causes the separation mechanism 270, which will be described in detail below, to abut the caster rollers 252R and 252L against the registration rollers 212R and 212L, respectively. In Step S13, the controller 50 discharges the sheet S on which an image is formed, to the stacking portion 750 of the stacking module 700, and ends the printing job.

Note that in a case where an image forming operation (i.e., a double-side printing) is performed for forming images on both sides of the sheet S, the controller 50 conveys, after Step S11, the sheet S on which first side an image is formed to the duplex conveyance path. In this case, the controller 50 causes the first reversing portion 420 to reverse the sheet S and convey the sheet S again toward the registration unit 210. After that, the controller 50 causes an image to be formed on a second side of the sheet S, by executing Step S2 and the following steps on the reversed sheet.

In the above description, the skew correction and the lateral-deviation correction have been described separately. However, the registration unit 210 can execute the skew correction and the lateral-deviation correction simultaneously by using the registration roller pairs 240L and 240R. That is, the controller 50 can simultaneously execute the control (i.e., the active registration) that corrects the skew of the sheet S by mainly controlling the difference in speed between the registration roller pair 240L and 240R, and the control (i.e., the steering operation) that corrects the lateral deviation of the sheet S by mainly controlling the tilt angle of the registration roller pairs 240L and 240R. Note that correcting the skew and the lateral deviation simultaneously means that the period of time in which the sheet S is pivoted for the skew correction and the period of time in which the sheet S is moved in the sheet width direction for the lateral-deviation correction at least overlap with each other.

Configuration of Caster Roller

Figure 9:
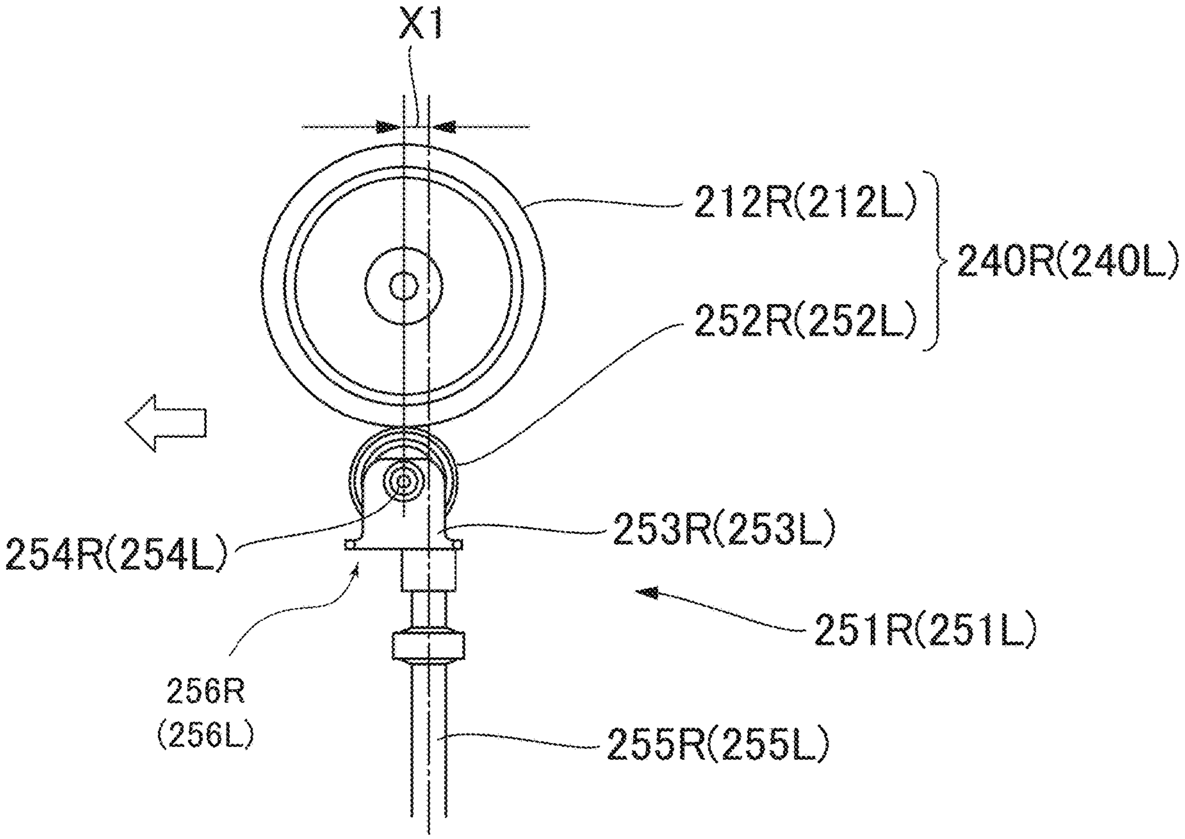
FIG. 9 is a front view illustrating a registration roller pair.
Figure 10A:
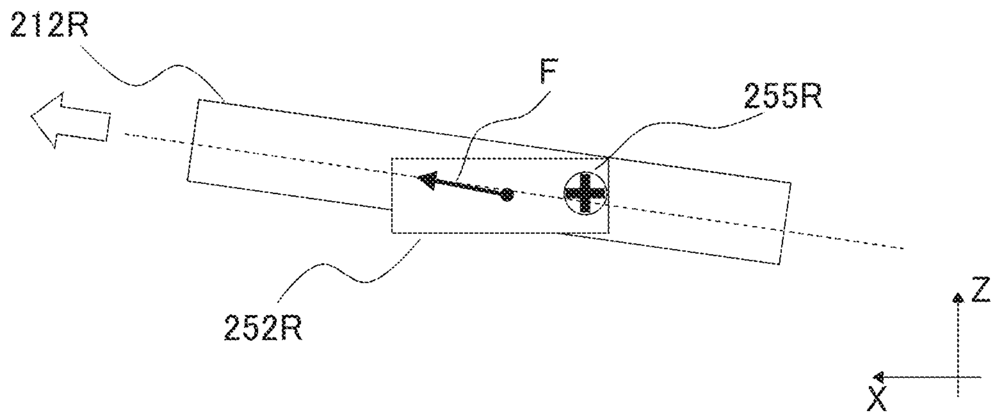
FIG. 10A is a diagram illustrating a state immediately after a registration roller is pivoted.
Figure 10B:
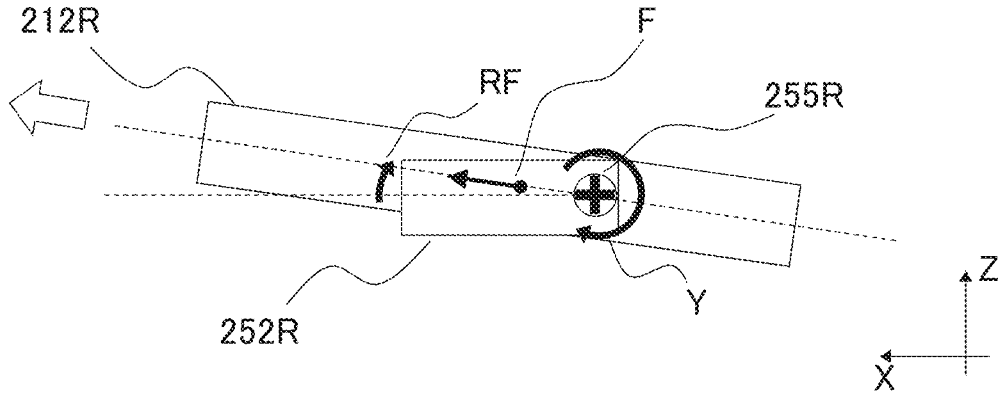
FIG. 10B is a diagram illustrating restoring force produced in a caster roller by the registration roller being pivoted.
Figure 10C:
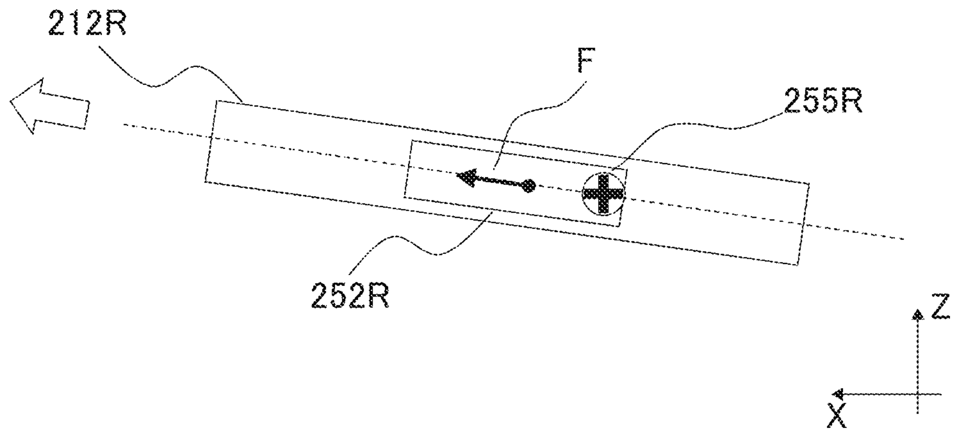
FIG. 10C is a diagram illustrating a state where the caster roller has been pivoted.

Next, a configuration of the caster rollers 252L and 252R will be described with reference to FIGS. 9 and 10. FIG. 9 is a front view illustrating the registration roller pairs 240R and 240L. FIG. 10A is a diagram illustrating a state immediately after the registration roller 212R is pivoted. FIG. 10B is a diagram illustrating restoring force RF produced in the caster roller 252R by the registration roller 212R being pivoted. FIG. 10C is a diagram illustrating a state where the caster roller 252R has been pivoted.

As illustrated in FIG. 9, the registration unit 210 (see FIG. 2) includes caster roller units 251L and 251R. The caster roller unit 251R includes a holding portion 256R that serves as a second holding portion, and that includes a pivot rotation shaft 255R and a frame 253R fixed to the leading end of the pivot rotation shaft 255R. The pivot rotation shaft 255R that serves as a second shaft portion is supported by a below-described swing member 271 (see FIG. 11) such that the pivot rotation shaft 255R can rotate around a center line (i.e., a second pivot axis) of the pivot rotation shaft 255R. In addition, the caster roller unit 251R includes a roller shaft 254R rotatably supported by the frame 253R, and the caster roller 252R fixed to the roller shaft 254R.

Similarly, the caster roller unit 251L includes a holding portion 256L that serves as a first holding portion, and that includes a pivot rotation shaft 255L and a frame 253L fixed to the leading end of the pivot rotation shaft 255L. The pivot rotation shaft 255L that serves as a first shaft portion is supported by the below-described swing member 271 (see FIG. 11) such that the pivot rotation shaft 255L can rotate around a center line (i.e., a first pivot axis) of the pivot rotation shaft 255L. In addition, the caster roller unit 251L includes a roller shaft 254L rotatably supported by the frame 253L, and the caster roller 252L fixed to the roller shaft 254L.

Note that although the caster rollers 252L and 252R are respectively fixed to the rotatable roller shafts 254L and 254R in the present embodiment, the present disclosure is not limited to this. For example, the roller shafts 254L and 254R may be respectively fixed to the frames 253L and 253R, and the caster rollers 252L and 252R may be respectively fixed rotatably to the roller shafts 254L and 254R.

Since the caster roller units 251L and 251R have configurations identical to each other, the following description will be made for the caster roller unit 251R alone. As described above, the caster roller 252R can pivot (rotate) around the pivot rotation shaft 255R via the frame 253R and the roller shaft 254R. In addition, the pivot rotation shaft 255R is disposed upstream of a nip portion between the registration roller 212R and the caster roller 252R in the sheet conveyance direction X, and is separated from the nip portion by a distance X1. The distance X1 is referred to as a caster trail.

Next, a pivot operation of the caster roller 252R will be described in detail. The caster roller 252R is urged toward the registration roller 212R, by a spring 273R of the separation mechanism 270 that will be described in detail below. In a state where the registration roller 212R is driven by the conveyance driving motor M1R, the caster roller 252R receives frictional force in the nip portion between the registration roller 212R and the caster roller 252R, and rotates in accordance with the rotation of the registration roller 212R. In this state, as illustrated in FIG. 10A, the caster roller 252R receives force F from the registration roller 212R in a direction indicated by an arrow.

As described above, the pivot rotation shaft 255R of the caster roller unit 251R is disposed upstream of the nip portion of the registration roller pair 240R in the sheet conveyance direction X, and is separated from the nip portion by the distance X1. Thus, if the registration roller 212R starts the steering operation (i.e., the lateral-deviation correcting operation), the force F is applied to the caster roller 252R, as illustrated in FIG. 10A. That is, the force F is applied in a direction oblique with respect to the angle (orientation) of the caster roller 252R.

As a result, as illustrated in FIG. 10B, the moment indicated by an arrow Y is produced in the caster roller 252R around the pivot rotation shaft 255R, so that restoring force RF is produced so that the caster roller 252R and the registration roller 212R have the same angle. The moment indicated by the arrow Y increases or decreases in accordance with the difference between the direction of the caster roller 252R that pivots around the pivot rotation shaft 255R (the direction is the sheet conveyance direction X in FIG. 10B) and the direction of the vector of the force F. The moment decreases as the difference decreases. Thus, when the direction of the vector of the force F and the direction of the caster roller 252R become equal to each other, the moment indicated by the arrow Y becomes zero. As illustrated in FIG. 10C, this mechanism causes the caster roller

252R to pivot in accordance with the pivot of the registration roller 212R, so that the registration roller 212R and the caster roller 252R are aligned with each other.

As described above, in the present embodiment, in the configuration in which the registration roller 212R is pivoted by the driving force of the steering motor M2R, the caster trail (i.e., the distance X1) is set between the pivot rotation shaft 255R of the caster roller 252R and the nip portion of the registration roller pair 240R. Thus, the caster roller 252R automatically pivots in accordance with the steering operation of the registration roller 212R, so that the registration roller 212R and the caster roller 252R have the same pivot angle. Note that the distance X1 that is the caster trail is set so as to have a predetermined value.

Separation Mechanism

Figure 11:
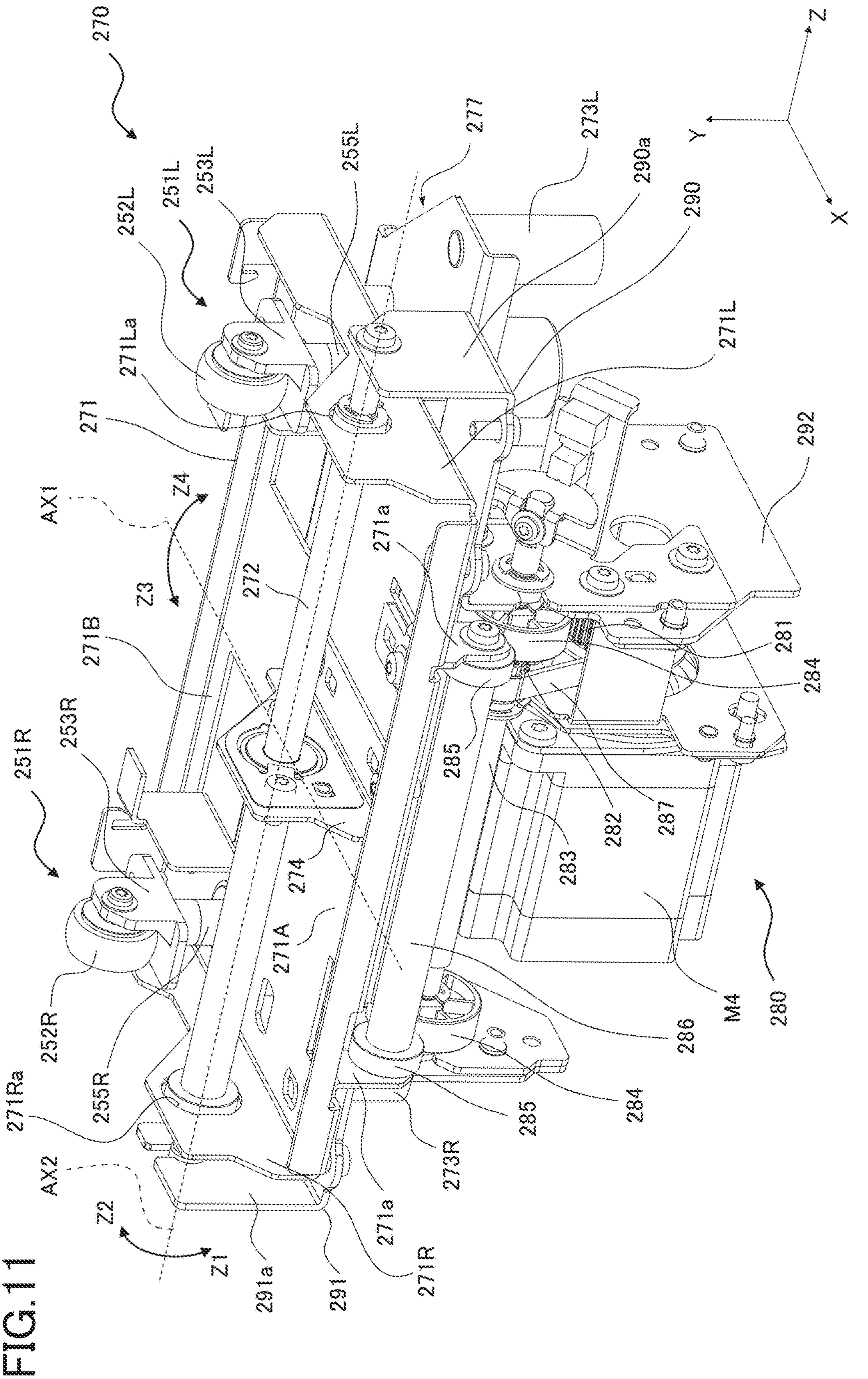
FIG. 11 is a perspective view illustrating a separation mechanism.
Figure 12:
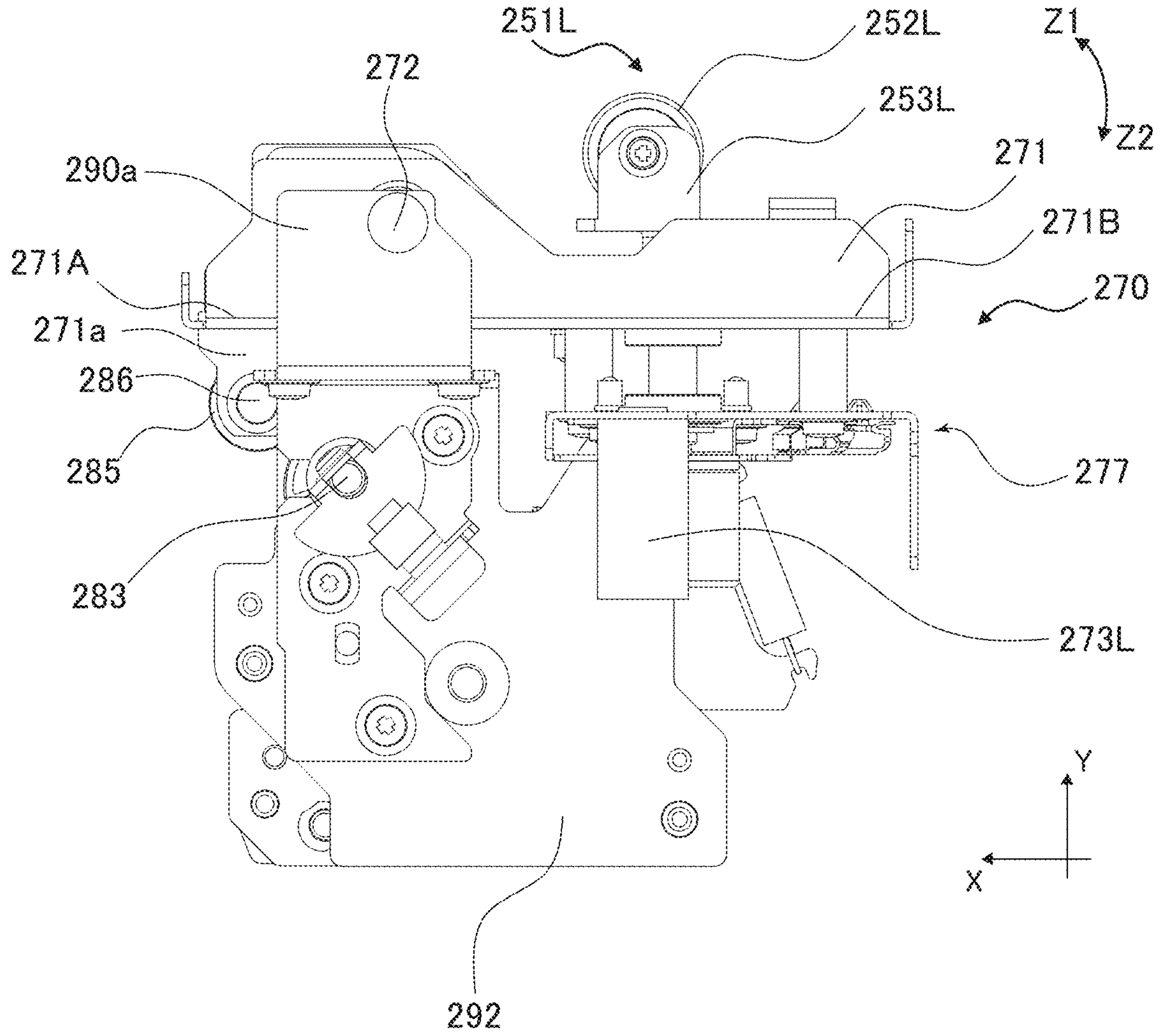
FIG. 12 is a side view illustrating the separation mechanism.
Figure 13:
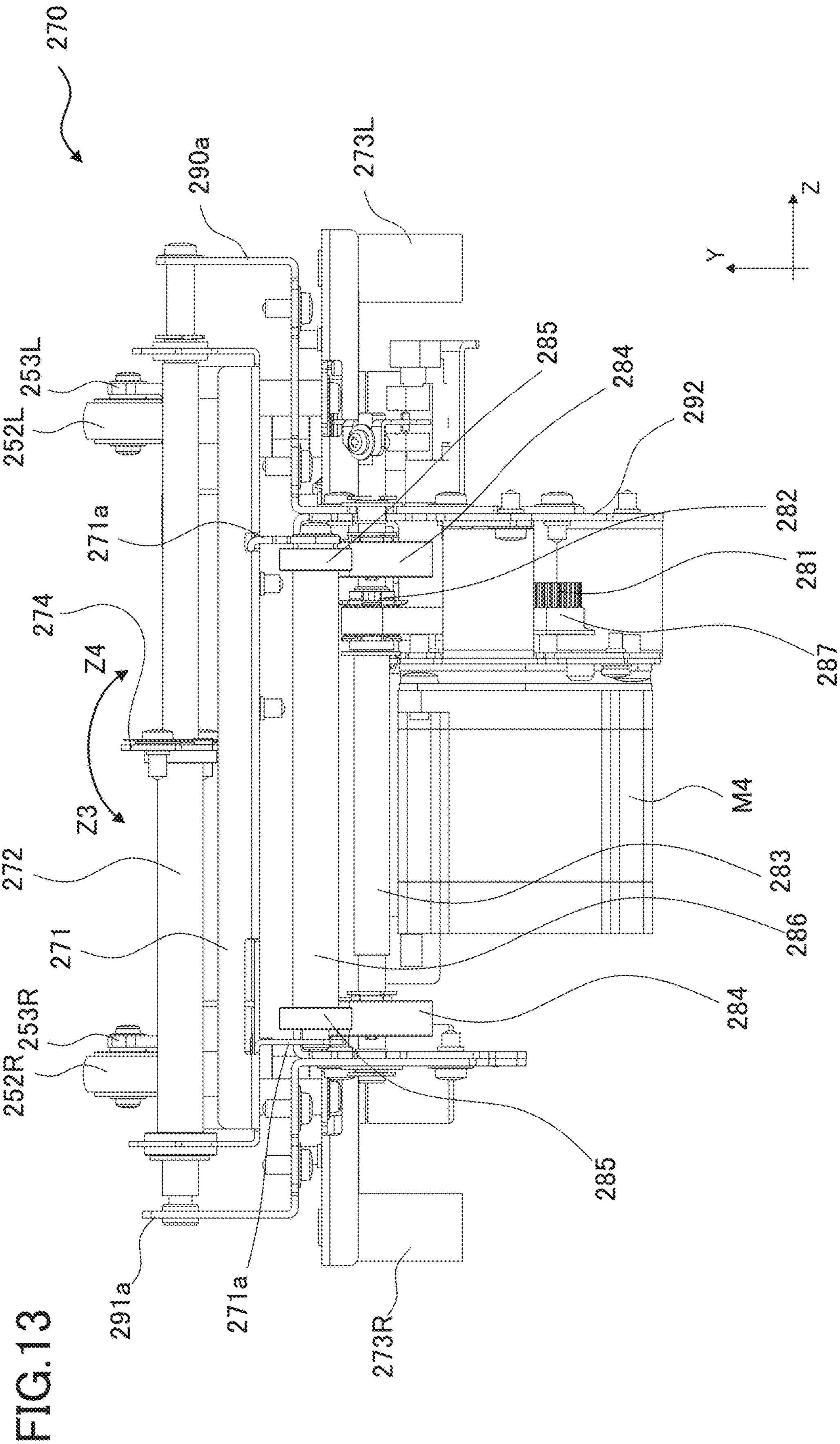
FIG. 13 is a front view illustrating the separation mechanism.

Next, the separation mechanism 270 will be described with reference to FIGS. 11 to 13. FIG. 11 is a perspective view illustrating the separation mechanism 270. FIG. 12 is a side view illustrating the separation mechanism 270. FIG. 13 is a front view illustrating the separation mechanism 270. Note that each of FIGS. 11 to 13 illustrates only a side which is formed with respect to the conveyance path of the sheet S, and which includes the caster rollers 252L and 252R; and does not illustrate a side which includes the registration rollers 212L and 212R, and a guide which forms the conveyance path.

As illustrated in FIGS. 11 to 13, the separation mechanism 270 includes frames 290 and 291, a support frame 292, and a driving portion 280. The frames 290 and 291 are fixed to a support member (not illustrated) disposed in the print module 200. The support frame 292 connects the frames 290 and 291. The frames 290 and 291 respectively include side-face portions 290*a* and 291*a* that extend upward. In addition, the separation mechanism 270 includes a swing shaft 272 and a swing member 271. The swing shaft 272 is fixed to the side-face portions 290*a* and 291*a*, each of which serves as a fixing member, and extends in the sheet width direction Z. The swing member 271 is supported by the swing shaft 272. In FIG. 11, a center line of the swing shaft 272 is illustrated as a swing axis AX2 that serves as a second swing axis.

In addition, a swing support member 274 is attached to the swing member 271, and the swing member 271 is supported such that the swing member 271 can swing with respect to the swing shaft 272, via the swing support member 274. That is, the swing member 271 can swing around the swing axis AX2 that is a center line of the swing shaft 272 extending in the sheet width direction Z, toward a Z1 direction and a Z2 direction opposite to the Z1 direction.

Furthermore, the swing member 271 includes side walls 271L and 271R formed at both end portions of the swing member 271 in the sheet width direction Z and extending upward. The side walls 271L and 271R respectively include support holes 271La and 271Ra. The support holes 271La and 271Ra are holes through which the swing shaft 272 passes. In addition, a clearance is formed at least between the swing shaft 272 and each of the support holes 271La and 271Ra in the Y direction (i.e., an up and down direction, vertical direction, gravity direction). For example, the inner diameter of each of the support holes 271La and 271Ra is almost equal to the outer diameter of the swing shaft 272 in the sheet conveyance direction X, and is larger than the outer diameter of the swing shaft 272 in the Y direction.

The swing support member 274 is made thin in the sheet width direction Z. As described above, the clearance is formed between the swing shaft 272 and each of the support holes 271La and 271Ra in the Y direction. Thus, the swing member 271 can swing around a swing axis AX1 that serves as a first swing axis passing through the swing support member 274 and extending in the sheet conveyance direction X. That is, the swing member 271 can swing around the swing axis AX1 toward a Z3 direction and a Z4 direction opposite to the Z3 direction.

The pivot rotation shafts 255L and 255R are pivotally (rotatably) supported by the swing member 271. Thus, the caster rollers 252L and 252R, which can pivot around the pivot rotation shafts 255L and 255R, move together with the swing member 271. In other words, the caster rollers 252L and 252R can swing around the swing shaft 272 extending in the sheet width direction Z, toward the Z1 direction and the Z2 direction; and can swing around the swing axis AX1 extending in the sheet conveyance direction X, toward the Z3 direction and the Z4 direction.

In the following description, a downstream side of the swing member 271 with respect to the swing shaft 272 in the sheet conveyance direction X is referred to as one end portion 271A, and an upstream side of the swing member 271 with respect to the swing shaft 272 in the sheet conveyance direction X is referred to as another end portion 271B. Thus, in a case where the swing member 271 swings around the swing shaft 272, the one end portion 271A and the other end portion 271B move opposite to each other in the Y direction.

Both of the caster rollers 252L and 252R are disposed upstream of the swing shaft 272 in the sheet conveyance direction X, that is, disposed on the other end portion 271B side. Thus, in a case where the swing member 271 swings around the swing shaft 272, both of the caster rollers 252L and 252R move in the same direction, in the up and down direction. On the other hand, the caster rollers 252L and 252R are disposed opposite to each other with respect to the swing axis AX1 in the sheet width direction Z. Thus, in a case where the swing member 271 swings around the swing axis AX1, both of the caster rollers 252L and 252R move in the opposite directions, in the up and down direction.

The other end portion 271B of the swing member 271 is urged upward (in the Y direction) by springs 273L and 273R, via a pressing portion 277. More specifically, one end of each of the springs 273L and 273R is fixed to a fixing member (not illustrated), and the other end is connected to the pressing portion 277. The urging force of the springs 273L and 273R that may be compression springs is transmitted to the other end portion 271B of the swing member 271, via the pressing portion 277.

Thus, the caster rollers 252L and 252R are urged toward the registration rollers 212L and 212R by the springs 273L and 273R, and are in contact with the registration rollers 212L and 212R at a predetermined nip pressure. In this state, the registration roller pairs 240L and 240R are in an abutment state. In addition, the springs 273L and 273R are disposed substantially on a common line in the sheet width direction Z. In other words, the springs 273L and 273R are disposed such that at least a portion of the spring 273L and at least a portion of the spring 273R overlap with each other when viewed in the sheet width direction Z. Furthermore, the springs 273L and 273R are disposed opposite to each other with respect to the swing axis AX1 in the sheet width direction Z. Thus, the springs 273L and 273R balance the caster rollers 252L and 252R so that the caster rollers 252L and 252R press the registration rollers 212L and 212R with substantially the same level of force.

The other end portion 271B of the swing member 271 presses the caster rollers 252L and 252R via the pivot rotation shafts 255L and 255R and the frames 253L and 253R. However, the other end portion 271B does not prevent the pivot operation of the caster rollers 252L and 252R that pivots the caster rollers 252L and 252R around the pivot rotation shafts 255L and 255R.

On the other hand, the one end portion 271A of the swing member 271 includes bent portions 271*a* and 271*a* that are bent downward. Note that the bent portions 271*a* and 271*a* may be formed integrally with the swing member 271, or may be members separate from the swing member 271 and may be fixed to the swing member 271. The bent portions 271*a* and 271*a* are portions to which a support shaft 286 is fixed. In addition, driven rollers 285 and 285 are rotatably supported by both ends of the support shaft 286.

The above-described driving portion 280 includes the separation motor M4, an output pulley 281, a belt 287, an input pulley 282, a rotation shaft 283, and cams 284 and 284. The separation motor M4 is attached to the support frame 292, and the output pulley 281 is fixed to the output shaft of the separation motor M4. The rotation shaft 283 is rotatably supported by the support frame 292, and the input pulley 282 and the cams 284 and 284 are fixed to the rotation shaft 283.

The belt 287 is wound around the output pulley 281 and the input pulley 282, and the rotation of the output pulley 281 is transmitted to the input pulley 282 via the belt 287. If the input pulley 282 rotates, the rotation shaft 283 rotates, and the cams 284 and 284 attached to the rotation shaft 283 rotate. The cams 284 and 284 are in contact with the driven rollers 285 and 285 that swing together with the one end portion 271A of the swing member 271. The distance between the center of rotation of each of the cams 284 and 284 and the outer circumferential surface of the cam is not constant. Thus, if the cams 284 and 284 rotate, the one end portion 271A of the swing member 271 moves in the Y direction (i.e., the up and down direction) via the driven rollers 285 and 285.

That is, the cams 284 and 284 are driven and rotated by the separation motor M4, so that the swing member 271 swings around the swing shaft 272 toward the Z1 direction and the Z2 direction. If the swing member 271 swings around the swing shaft 272 toward the Z2 direction against the urging force of the springs 273L and 273R, the nip of the registration rollers 212L and 212R is released, and the caster rollers 252L and 252R are separated from the registration rollers 212L and 212R. As a result, the state of the registration roller pairs 240L and 240R becomes a separation state. That is, the separation motor M4 of the present embodiment is a common driving source (actuator) that switches the state of the right and left registration roller pairs 240R and 240L between the abutment state and the separation state. Note that the mechanism for switching the state of the registration roller pairs 240L and 240R between the abutment state and the separation state is not limited to a mechanism that uses a motor and cams. For example, the swing member 271 may be moved by using a solenoid.

As described in the steps S8 to S10 of FIG. 8, after the skew correction and the lateral-deviation correction are performed by the registration unit 210, the sheet S is further conveyed by the print belt unit 220. After the sheet S is attracted to the print belt 25, the caster rollers 252L and 252R are separated from the registration rollers 212L and 212R by driving the separation motor M4. With this operation, the sheet S is conveyed, without receiving the conveyance resistance from the registration rollers 212L and 212R. As a result, an image can be formed with high accuracy, on the sheet S by the recording portion 230.

In addition, in the abutment state of the registration roller pairs 240L and 240R, the swing member 271 can swing around the swing axis AX1. Thus, the caster rollers 252L and 252R can be in contact with the registration rollers 212L and 212R, with good balance.

Summary of Present Embodiment

As described above, the separation mechanism 270 of the present embodiment includes the swing member 271 that can swing around the swing axis AX1 extending along the sheet conveyance direction X, and around the swing shaft 272 extending along the sheet width direction Z. The swing axis AX1 and the swing axis AX2, which is the center line of the swing shaft 272, are orthogonal to each other. The swing member 271 is swung around the swing shaft 272 by the driving force of the separation motor M4, so that the state of the caster rollers 252L and 252R can be switched between the abutment state and the separation state.

In addition, in the abutment state where the caster rollers 252L and 252R are respectively in contact with the registration rollers 212L and 212R, the swing member 271 can swing around the swing axis AX1 toward the Z3 direction and the Z4 direction and supports the caster rollers 252L and 252R. The swing axis AX1 is positioned between the caster rollers 252L and 252R in the sheet width direction Z. Thus, since the swing member 271 swings around the swing axis AX1, the caster rollers 252L and 252R are in contact with the registration rollers 212L and 212R, with good balance. Thus, even in a case where the positions of the registration rollers 212L and 212R are deviated in the Y direction due to assembly tolerance of components or the like, since the swing member 271 swings around the swing axis AX1, the difference in nip pressure between the registration roller pairs 240L and 240R can be reduced. As a result, the accuracy of the correcting operation that corrects the positional deviation of sheets can be increased, and the failure in conveyance of sheets can be reduced.

In addition, the separation mechanism 270 includes the spring 273L that serves as a first urging member, and the spring 273R that serves as a second urging member. The spring 273L is disposed on a first side with respect to the swing axis AX1 in the sheet width direction Z, and urges the swing member 271 toward the registration roller 212L. The spring 273R is disposed on a second side with respect to the swing axis AX1 in the sheet width direction Z, and urges the swing member 271 toward the registration roller 212R. Furthermore, the spring 273L is disposed such that at least a portion of the spring 273L overlaps with the spring 273R when viewed in the sheet width direction Z. Thus, the caster rollers 252L and 252R can be brought into contact with the registration rollers 212L and 212R, with good balance, by the springs 273L and 273R.

The swing axis AX1 is positioned in a center portion between the caster rollers 252L and 252R in the sheet width direction Z. However, even in a case where the swing axis AX1 is shifted from the center portion, the caster rollers 252L and 252R can be brought into contact with the registration rollers 212L and 212R, with good balance, by the springs 273L and 273R.

In addition, the springs 273L and 273R are disposed on the same side (i.e., the upstream side) with respect to the swing shaft 272 in the sheet conveyance direction X. Thus, the springs 273L and 273R function also as springs that allow the caster rollers 252L and 252R to be in the abutment state.

Furthermore, the separation mechanism 270 includes the cams 284 and 284 disposed opposite to the caster rollers 252L and 252R with respect to the swing axis AX2 in the sheet conveyance direction X. The driving portion 280 that includes the cams 284 and 284 and the separation motor M4 is disposed on the one end portion 271A side of the swing member 271 with respect to the swing axis AX2. In addition, the caster rollers 252L and 252R and the springs 273L and 273R are disposed on the other end portion 271B side of the swing member 271 with respect to the swing axis AX2. In this arrangement, the registration unit 210 can be downsized.

The caster roller 252L can pivot around the center line of the pivot rotation shaft 255L, and the center line is offset (shifted) from the nip portion of the registration roller pair 240L in the sheet conveyance direction X, by the distance X1 (i.e., a caster trail). Similarly, the caster roller 252R can pivot around the center line of the pivot rotation shaft 255R, and the center line is offset from the nip portion of the registration roller pair 240R in the sheet conveyance direction X, by the distance X1. Thus, the caster rollers 252L and 252R can respectively pivot in accordance with the pivot of the registration rollers 212L and 212R. Note that although both of the caster rollers 252L and 252R have the distance X1, in the present embodiment, as the caster trail, the caster trails of the right and left caster rollers 252R and 252L may not necessarily be equal to each other.

In addition, in the present embodiment, the caster rollers 252L and 252R can pivot around the respective pivot rotation shafts that are independent of each other. In addition, the caster rollers 252L and 252R are supported by the single swing member 271 via the respective pivot rotation shafts. The swing member 271 swings around the swing shaft 272, so that the state of the two caster rollers 252L and 252R can be switched between the abutment state and the separation state. In this configuration, the apparatus can be downsized, and the caster rollers 252L and 252R can be arranged with high accuracy.

OTHER EMBODIMENTS

In the present embodiment, the swing member 271 can swing around the swing axis AX1 and the swing shaft 272. The swing axis AX1 may not necessarily be parallel to the sheet conveyance direction X, and may be inclined with respect to the sheet conveyance direction X in a range of ±15°. Similarly, the swing shaft 272 may not necessarily be parallel to the sheet width direction Z, and may be inclined with respect to the sheet width direction Z in a range of ±15°. That is, the swing axis AX1 has only to extend along the sheet conveyance direction X, and the swing shaft 272 has only to extend along the sheet width direction Z.

In the present embodiment, the caster rollers 252L and 252R are disposed upstream of the swing shaft 272 in the sheet conveyance direction X. However, the present disclosure is not limited to this. For example, the caster rollers 252L and 252R may be disposed downstream of the swing shaft 272 in the sheet conveyance direction X. In addition, in the present embodiment, the springs 273L and 273R are disposed upstream of the swing shaft 272 in the sheet conveyance direction X. However, the present disclosure is not limited to this. For example, the springs 273L and 273R may be disposed downstream of the swing shaft 272 in the sheet conveyance direction X.

In the present embodiment, the cams 284 and 284 and the separation motor M4 are disposed downstream of the swing shaft 272 in the sheet conveyance direction X. However, the present disclosure is not limited to this. For example, the cams 284 and 284 and the separation motor M4 may be disposed upstream of the swing shaft 272 in the sheet conveyance direction X.

In the present embodiment, the springs 273L and 273R urge the caster rollers 252L and 252R so that the caster rollers 252L and 252R are in an abutment state. However, the present disclosure is not limited to this. For example, the springs 273L and 273R may urge the caster rollers 252L and 252R so that the caster rollers 252L and 252R are in a separation state, and the state of the caster rollers 252L and 252R may be changed to the abutment state by the driving portion 280.

In the present embodiment, the springs 273L and 273R press the swing member 271 via the pressing portion 277. However, the present disclosure is not limited to this. For example, the springs 273L and 273R may directly press the other end portion 271B of the swing member 271 not via the pressing portion 277.

In the present embodiment, the description has been made, as an example, for the case where the registration unit 210 performs the skew correction in a position positioned upstream of the recording portion 230 in the sheet conveyance direction X. However, the present disclosure is not limited to this. For example, the registration unit 210 may be disposed upstream in the sheet conveyance direction X, in a reading portion that reads an image of a sheet, a punch portion that punches in a sheet, or a folding portion that folds a sheet.

In the present embodiment, the swing member 271 can swing around the swing shaft 272. However, the present disclosure is not limited to this. For example, the swing member 271 may switch the state of the caster rollers 252L and 252R between the abutment state and the separation state by sliding in the Y direction (i.e., an up and down direction).

In the present embodiment, the swing member 271 is swung around the swing shaft 272 by using the cams 284 and 284. However, the present disclosure is not limited to this. For example, the swing member 271 may be moved by converting the rotation of the separation motor M4 to the reciprocating motion by using a link mechanism or the like. In addition, in the present embodiment, the cams 284 and 284 press the swing member 271 via the driven rollers 285 and 285. However, the present disclosure is not limited to this. For example, the cams 284 and 284 may directly press the swing member 271. In this case, an abutment portion between the cam 284 and the swing member 271 may be coated with a coating that reduces slide resistance, or a member having low slide resistance may be stuck on the abutment portion.

In the present embodiment, the caster rollers 252L and 252R are pressed against the registration rollers 212L and 212R by the urging force of the springs 273L and 273R. However, the present disclosure is not limited to this. For example, the weight of the one end portion 271A of the swing member 271 may be made larger than the weight of the other end portion 271B, and the swing member 271 may be urged toward the Z1 direction by the self weight of the swing member 271.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the present disclosure is not limited to the disclosed embodiments. The scope of the following claims is to be accorded the broadest interpretation so as to encompass all such modifications and equivalent structures and functions.

This application claims the benefit of Japanese Patent Application No. 2024-095218, filed Jun. 12, 2024, which is hereby incorporated by reference herein in its entirety.

What is claimed is:

1. A sheet conveyance apparatus comprising:

a first driving roller and a second driving roller disposed adjacent to each other in a sheet width direction orthogonal to a sheet conveyance direction, each of the first driving roller and the second driving roller being configured to rotate when receiving a driving force;

a first steering portion configured to change a tilt angle of a rotation axis of the first driving roller with respect to the sheet width direction;

a second steering portion configured to change a tilt angle of a rotation axis of the second driving roller with respect to the sheet width direction;

a first driven roller configured to convey a sheet together with the first driving roller while nipping the sheet, the first driven roller being configured to pivot, in accordance with a change in the tilt angle of the rotation axis of the first driving roller, around a first pivot axis that intersects both of the sheet conveyance direction and the sheet width direction;

a second driven roller configured to convey the sheet together with the second driving roller while nipping the sheet, the second driven roller being configured to pivot, in accordance with a change in the tilt angle of the rotation axis of the second driving roller, around a second pivot axis that intersects both of the sheet conveyance direction and the sheet width direction; and a separation mechanism configured to switch a state of the first driven roller and the second driven roller between an abutment state and a separation state, the abutment state being a state where the first driven roller and the second driven roller are respectively in contact with the first driving roller and the second driving roller, the separation state being a state where the first driven roller and the second driven roller are respectively separated from the first driving roller and the second driving roller, wherein the separation mechanism includes a swing member configured to support the first driven roller and the second driven roller and swing around a first swing axis extending along the sheet conveyance direction, and wherein the first swing axis is positioned between the first driven roller and the second driven roller in the sheet width direction.

2. The sheet conveyance apparatus according to claim 1, wherein the swing member is configured to swing around a second swing axis extending along the sheet width direction, and wherein the separation mechanism is configured to switch the state of the first driven roller and the second driven roller between the abutment state and the separation state by the swing member swinging around the second swing axis.

3. The sheet conveyance apparatus according to claim 2, wherein the first driven roller and the second driven roller are disposed on the same side with respect to the second swing axis in the sheet conveyance direction.

4. The sheet conveyance apparatus according to claim 3, wherein the separation mechanism includes:

a driving source; and a cam configured to be rotated by a driving force from the driving source and cause the swing member to swing around the second swing axis.

5. The sheet conveyance apparatus according to claim 4, wherein the cam is disposed opposite to the first driven roller and the second driven roller with respect to the second swing axis in the sheet conveyance direction.

6. The sheet conveyance apparatus according to claim 2, wherein the first swing axis and the second swing axis are orthogonal to each other.

7. The sheet conveyance apparatus according to claim 2, wherein the separation mechanism includes:

a first urging member disposed on a first side with respect to the first swing axis in the sheet width direction and configured to urge the swing member toward the first driving roller; and a second urging member disposed on a second side with respect to the first swing axis in the sheet width direction and configured to urge the swing member toward the second driving roller.

8. The sheet conveyance apparatus according to claim 7, wherein the first urging member and the second urging member are disposed on the same side as a side on which the first driven roller and the second driven roller are disposed, with respect to the second swing axis in the sheet conveyance direction.

9. The sheet conveyance apparatus according to claim 7, wherein the first urging member and the second urging member are configured to urge the swing member such that the first driven roller and the second driven roller are in the abutment state.

10. The sheet conveyance apparatus according to claim 7, wherein the first urging member is disposed such that at least a portion of the first urging member overlaps with the second urging member when viewed in the sheet width direction.

11. The sheet conveyance apparatus according to claim 2, wherein the separation mechanism includes a swing shaft which is supported by a fixing member and whose center line is equal to the second swing axis, and wherein the swing member is supported by the swing shaft, with a clearance being formed between the swing member and the swing shaft in a direction that intersects both of the sheet conveyance direction and the sheet width direction.

12. The sheet conveyance apparatus according to claim 1, further comprising:

a first holding portion including a first shaft portion rotatably supported around the first pivot axis with respect to the swing member, the first holding portion being configured to rotatably support the first driven roller, and a second holding portion including a second shaft portion rotatably supported around the second pivot axis with respect to the swing member, the second holding portion being configured to rotatably support the second driven roller.

13. The sheet conveyance apparatus according to claim 12, wherein the first pivot axis is disposed to be offset, in the sheet conveyance direction, from a nip portion between the first driving roller and the first driven roller, and wherein the second pivot axis is disposed to be offset, in the sheet conveyance direction, from a nip portion between the second driving roller and the second driven roller.

14. The sheet conveyance apparatus according to claim 1, further comprising a control portion configured to correct positional deviation of a sheet in the sheet width direction by controlling the tilt angle of the rotation axis of the first driving roller and the tilt angle of the rotation axis of the second driving roller.

15. The sheet conveyance apparatus according to claim 14, wherein a conveyance speed of the second driving roller is controlled independently of a conveyance speed of the first driving roller, and wherein the control portion is configured to correct skew of a sheet by controlling difference in conveyance speed between the first driving roller and the second driving roller.

16. An image forming apparatus comprising:

the sheet conveyance apparatus according to claim 1; and an image forming portion configured to form an image on a sheet conveyed by the sheet conveyance apparatus.

* * * * *